United States Patent
Hwang et al.

(10) Patent No.: US 10,430,088 B2
(45) Date of Patent: Oct. 1, 2019

(54) STORAGE DEVICE CONFIGURED TO PERFORM TWO-WAY COMMUNICATION WITH HOST AND OPERATING METHOD THEREOF

(71) Applicant: SAMSUNG ELECTRONICS CO., LTD., Suwon-si, Gyeonggi-Do (KR)

(72) Inventors: Mina Hwang, Hwaseong-si (KR); Kwanggu Lee, Yongin-si (KR); Hojun Shim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 15 days.

(21) Appl. No.: 15/821,436

(22) Filed: Nov. 22, 2017

(65) Prior Publication Data

US 2018/0157426 A1 Jun. 7, 2018

(30) Foreign Application Priority Data

Dec. 1, 2016 (KR) .................... 10-2016-0162966

(51) Int. Cl.
  *G06F 3/06* (2006.01)
  *G06F 13/16* (2006.01)
(52) U.S. Cl.
  CPC ............ *G06F 3/0613* (2013.01); *G06F 3/061* (2013.01); *G06F 3/0659* (2013.01); *G06F 3/0679* (2013.01); *G06F 3/0688* (2013.01); *G06F 13/1626* (2013.01)
(58) Field of Classification Search
  None
  See application file for complete search history.

(56) References Cited

U.S. PATENT DOCUMENTS

| | | | |
|---|---|---|---|
| 7,433,984 B2 | 10/2008 | Das et al. | |
| 7,913,024 B2 | 3/2011 | Brown et al. | |
| 8,103,993 B2 | 1/2012 | Atherton et al. | |
| 8,819,306 B2 | 8/2014 | Ajanovic et al. | |
| 9,317,204 B2 | 4/2016 | Hahn et al. | |
| 9,489,141 B2 | 11/2016 | Nanduri et al. | |
| 2009/0007156 A1* | 1/2009 | Baek ................ | H04L 12/2803 719/328 |
| 2010/0082879 A1 | 4/2010 | McKean et al. | |
| 2013/0007353 A1* | 1/2013 | Shim ................ | G11C 16/10 177/103 |
| 2014/0201471 A1 | 7/2014 | Cutter et al. | |
| 2014/0237156 A1 | 8/2014 | Regula et al. | |

(Continued)

OTHER PUBLICATIONS

Caulfield et al., Moneta: A High-performance Storage Array Architecture for Next-generation, Non-volatile Memories, 2010, 43rd Annual IEEE/ACM International Symposium on Microarchitecture.*

*Primary Examiner* — Ryan Bertram
*Assistant Examiner* — Trang K Ta
(74) *Attorney, Agent, or Firm* — Volentine, Whitt & Francos, PLLC

(57) ABSTRACT

A storage device includes a controller that is configured to perform two-way communication with a host. The controller generates a plurality of requests including first requests and second requests associated with the host. The controller orders the plurality of requests such that the plurality of requests include at least one first request and at least two consecutive second requests.

20 Claims, 18 Drawing Sheets

(56) References Cited

U.S. PATENT DOCUMENTS

2015/0032955 A1* 1/2015 Suzuki ................. G06F 3/0689
711/114
2015/0317266 A1 11/2015 Kramer et al.
2016/0179404 A1 6/2016 Nanduri et al.
2016/0306547 A1* 10/2016 Perlstein ................. G06F 3/061

* cited by examiner

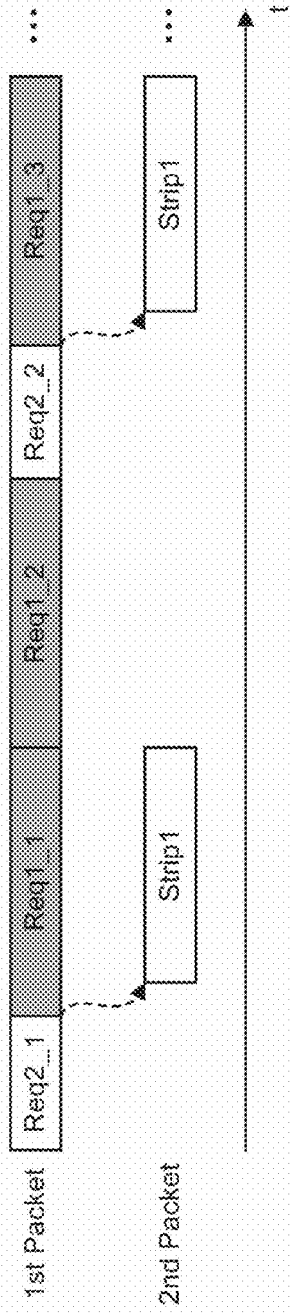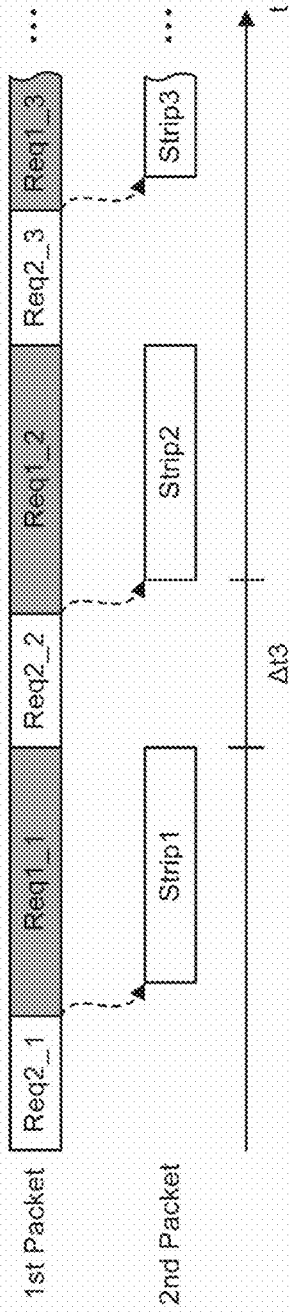

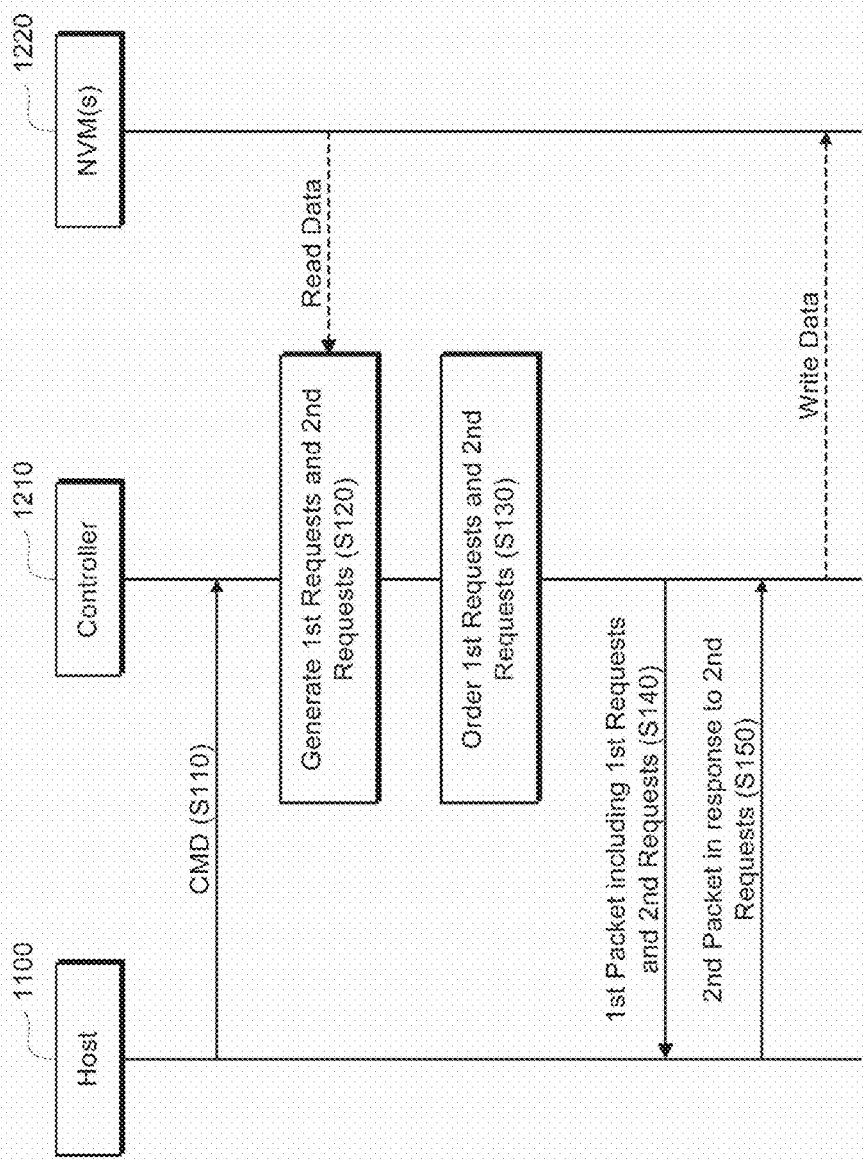

FIG. 17
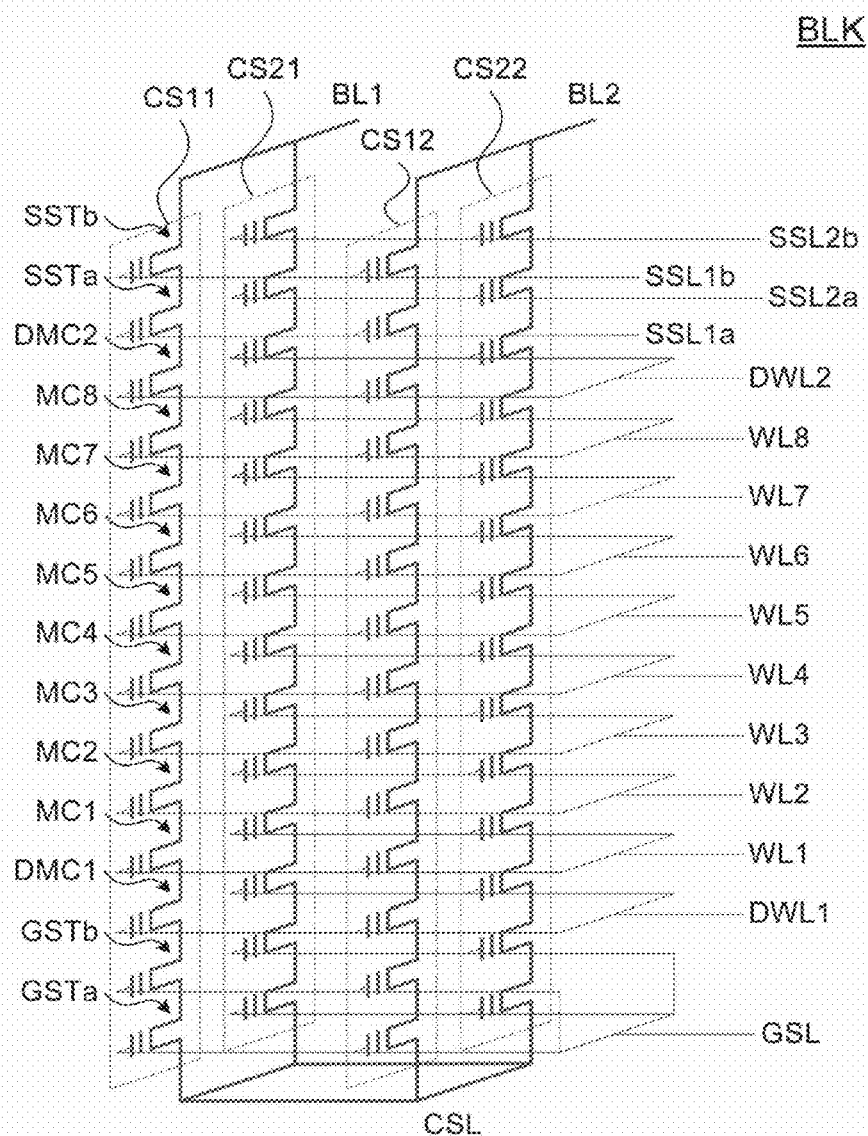
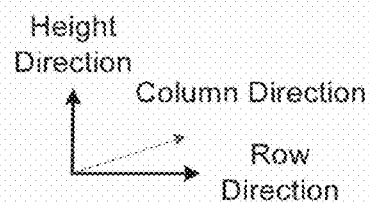

STORAGE DEVICE CONFIGURED TO PERFORM TWO-WAY COMMUNICATION WITH HOST AND OPERATING METHOD THEREOF

CROSS-REFERENCE TO RELATED APPLICATIONS

A claim for priority under 35 U.S.C. § 119 is made to Korean Patent Application No. 10-2016-0162966 filed Dec. 1, 2016, in the Korean Intellectual Property Office, the entire contents of which are hereby incorporated by reference.

BACKGROUND

Embodiments of the disclosure relate to a storage device, and more particularly, to a device to improve throughput of a storage device configured to perform two-way communication with a host and an operating method thereof.

Nowadays, various electronic devices, such as a high-capacity solid state drive (SSD), a smartphone, a desktop computer, a laptop computer, a tablet PC, and a wearable device, are being widely used. In general, each electronic device includes a storage device to store data. In particular, to cope with the high-capacity and high-speed trend of the electronic device, there has been a lot of effort to increase a capacity of the storage device of the electronic device and to improve a speed of the storage device. In pursuit of the effort, various protocols for an interface between an application processor (host) and a storage device of the electronic device have been adopted.

Meanwhile, there has been a lot of effort to improve throughput of two-way communication between the application processor and the storage device based on the various protocols.

SUMMARY

Embodiments of the disclosure provide a device to improve throughput of a storage device configured to perform two-way communication with a host and an operating method thereof.

According to an aspect of an embodiment, a storage device is configured to perform two-way communication with a host. The storage device includes a controller that generates a plurality of requests including first requests and second requests associated with the host and orders the plurality of requests such that the plurality of requests includes at least one first request from among the first requests and at least two consecutive second requests from among the second requests.

According to another aspect of an embodiment, a controller of a storage device is configured to perform two-way communication with a host. The controller includes an interface circuit and a request scheduler. The interface circuit includes an application layer configured to generate a plurality of requests including first requests and second requests associated with the host. The request scheduler orders the plurality of requests such that the plurality of requests include at least one first request from among the first requests and at least two consecutive second requests from among the second requests.

According to another aspect of an embodiment, an operating method of a storage device, which is configured to perform two-way communication with a host, generates a plurality of requests including first requests and the second requests. The method orders the plurality of requests such that the plurality of requests include at least one first request from among the first requests and at least two consecutive second requests from among the second requests. The plurality of requests is ordered with reference to a ratio of the number of the at least two consecutive second requests to the number of the at least one first request, the number of the at least two consecutive second requests, or a reception frequency of responses received from the host in response to the second requests.

According to another aspect of an embodiment, a nonvolatile memory storage device includes a nonvolatile memory and a memory controller. The memory controller receives commands from a host, generates first and second requests in response to the commands, reorders a sequence of the first and second requests from their order of generation. The commands are reordered in the sequence such that the number of second requests within the sequence exceeds the number of first requests within the sequence in accordance with respective numbers of the first and second requests generated in response to the commands Alternatively, the commands are reordered in the sequence such that the number of second requests within the sequence exceeds the number of first requests within the sequence in accordance with the frequency of responses received from the host in reply to second requests previously communicated to the host by the memory controller. The memory controller communicates the sequence to the host and accesses the nonvolatile memory in accordance with the generated first and second requests.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 8A to 8D are drawings illustrating packets exchanged through a TX line and an RX line illustrated in FIG. 7;

FIG. 9 is a flowchart for performing two-way communication between a host and the storage device, according to an embodiment of the disclosure;

FIG. 17 is a circuit diagram illustrating one of memory blocks included in a memory cell array of FIG. 16.

DETAILED DESCRIPTION

Below, embodiments of the disclosure may be described in detail and clearly to such an extent that one (hereinafter referred to as "an ordinary one") skilled in the art easily implements the disclosure.

Figure 1:
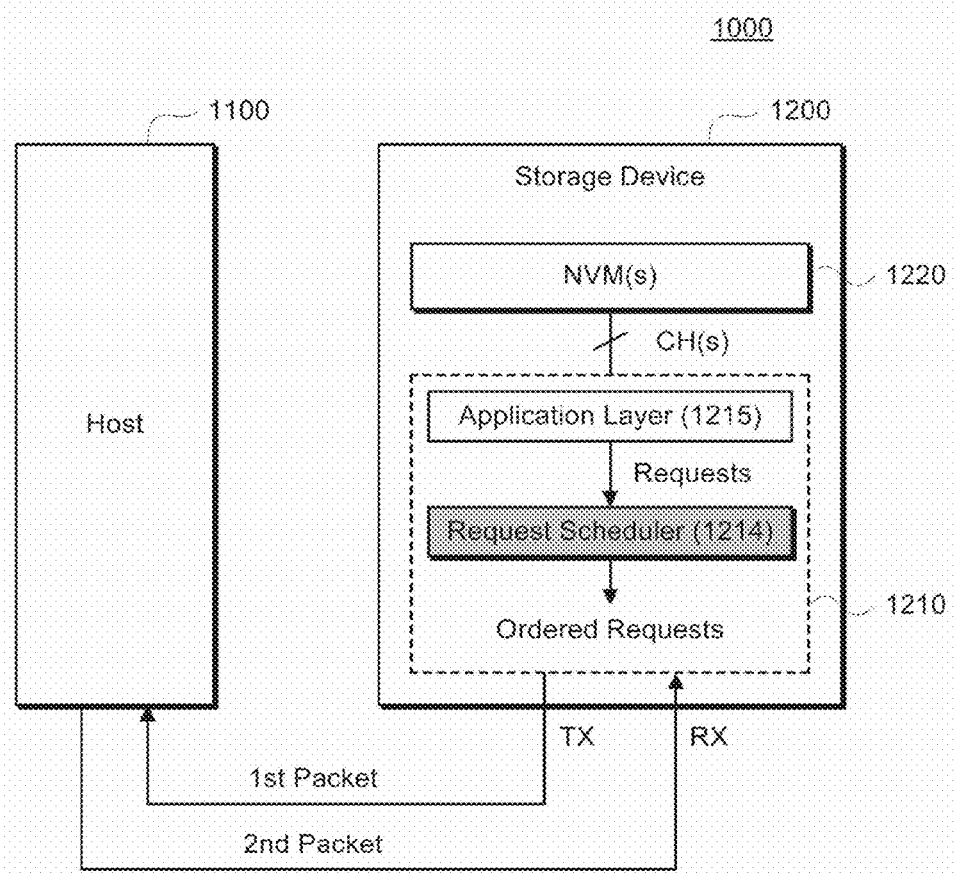
FIG. 1 is a block diagram illustrating a storage device, according to an embodiment of the disclosure.

FIG. 1 is a block diagram illustrating a storage device 1200, according to an embodiment of the disclosure. To help understand a description, the storage device 1200 is illustrated as being connected to a host 1100 to perform communication with the host 1100, and a storage system 1000 may include the host 1100 and the storage device 1200.

The host 1100 may manage and process overall operations of the storage system 1000. For example, the host 1100 may transmit various commands for performing a read operation or a write operation on the storage device 1200 to the storage device 1200. For example, the host 1100 may include one or more processor cores. The host 1100 may be implemented with dedicated circuits (e.g., field programmable gate arrays (FPGA) and application specific integrated circuits (ASICs)) or may be implemented with a system on chip (SoC). For example, the host 1100 may include a general-purpose processor, a special-purpose processor, or an application processor.

The storage device 1200 may include a controller 1210 and a nonvolatile memory 1220. For example, the storage device 1200 may be a solid state drive (SSD).

The controller 1210 may control overall operations of the storage device 1200. To this end, the controller 1210 may include at least one processor core and a buffer memory. For example, the controller 1210 may control the nonvolatile memory 1220. Under control of the controller 1210, data may be stored in the nonvolatile memory 1220 or may be read from the nonvolatile memory 1220.

The controller 1210 may generate various types of requests based on a command from the host 1100. For example, when a command from the host 1100 is a write command for the nonvolatile memory 1220, the controller 1210 may generate a read request associated with a host memory (not illustrated) of the host 1100. For example, when a command from the host 1100 is a read command for the nonvolatile memory 1220, the controller 1210 may generate a write request for the host memory of the host 1100. In this case, the write request for the host memory of the host 1100 may include read data read from the nonvolatile memory 1220. Besides, the controller 1210 may generate a message for informing the host 1100 of various events generated with respect to the storage device 1200.

The host 1100 may receive a read request, a write request, a message, etc. in the form of a packet from the controller 1210. This is shown in FIG. 1 as a first packet. For example, when the host 1100 processes a read request included in the first packet, the host 1100 may transmit write data to be stored in the nonvolatile memory 1220 to the controller 1210 in response to the read request. This is shown in FIG. 1 as a second packet.

The host 1100 and the storage device 1200 may communicate with each other based on one or more of various interface protocols. For example, the host 1100 and the storage device 1200 may communicate with each other by using at least one of serial interface protocols such as peripheral component interconnect express (PCIe), nonvolatile memory express (NVMe), universal flash storage (UFS), universal serial bus (USB), small computer system interface (SCSI), serial advanced technology attachment (SATA), serial attached SCSI (SAS), secure digital (SD) card, and embedded multimedia card (eMMC).

For example, the host 1100 and the storage device 1200 may be configured to perform the two-way communication. For example, the host 1100 and the storage device 1200 may be connected to each other through a TX line and an RX line. For example, data, requests, messages, etc. may be transmitted from the storage device 1200 to the host 1100 through the TX line, and data, commands, etc. may be transmitted from the host 1100 to the storage device 1200 through the RX line.

In the case where a read operation and a write operation are simultaneously generated with respect to the storage device 1200, to improve throughput of the two-way communication through the TX line and the RX line, the controller 1210 according to an embodiment of the disclosure may newly arrange requests, messages, etc. generated by an application layer 1215. To perform the operation, the controller 1210 may include a request scheduler 1214. The request scheduler 1214 will be described in detail later.

The nonvolatile memory 1220 may include memory cell arrays for storing data. For example, in the case where the memory cell arrays of the nonvolatile memory 1220 are implemented with a NAND flash memory, the nonvolatile memory 1220 may include three-dimensional (3D) memory cell arrays in which NAND strings are formed to be perpendicular to a substrate. However, a configuration of the nonvolatile memory 1220 may not be limited thereto. For example, the nonvolatile memory 1220 may include one or more of various nonvolatile memories such as a phase-change random access memory (PRAM), a magneto-resistive RAM (MRAM), a resistive RAM (ReRAM), and a ferro-electric RAM (FRAM).

Figure 2:
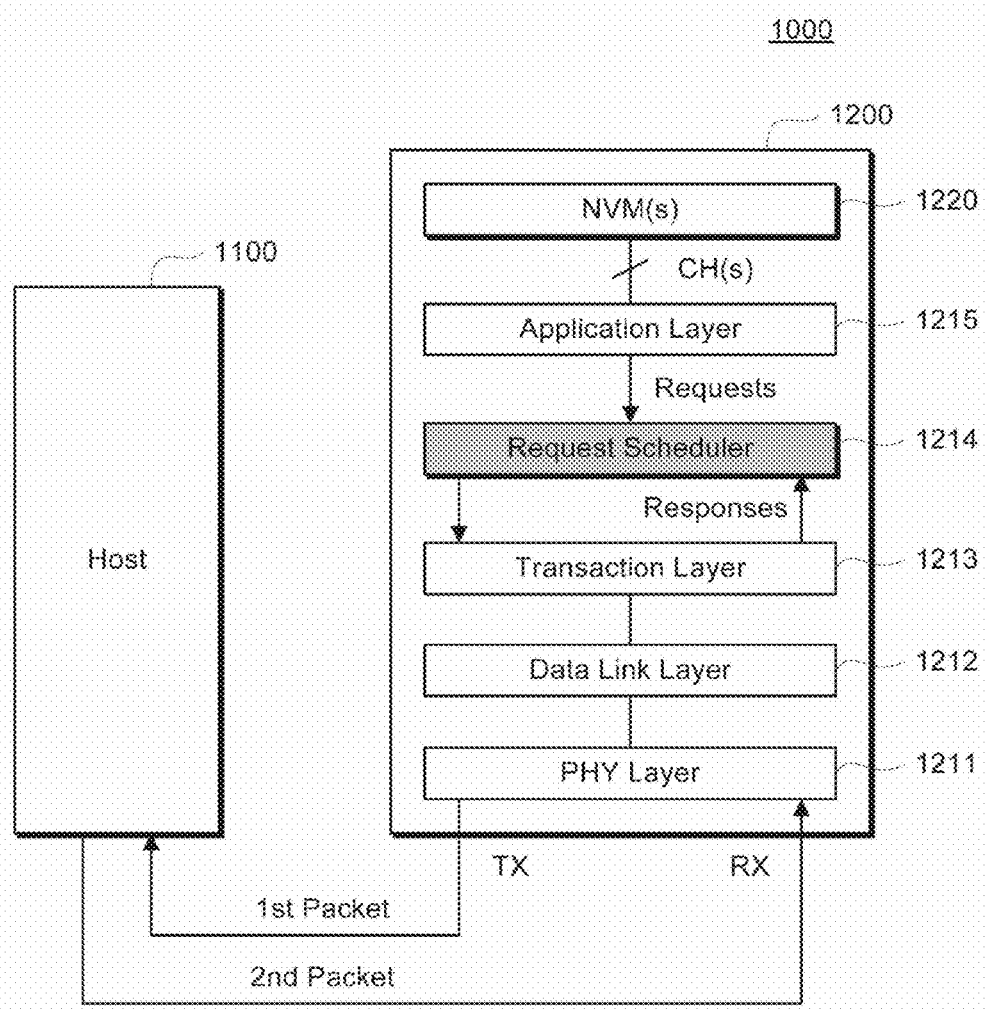
FIG. 2 is a block diagram illustrating a configuration of the storage device illustrated in FIG. 1.

FIG. 2 is a block diagram illustrating a configuration of the storage device 1200 illustrated in FIG. 1.

The host 1100 may include, although not illustrated in FIG. 2, a PHY layer, a data link layer, a transaction layer, and an application/host controller interface (HCI) layer (hereinafter referred to as an "application layer"). Each layer of the host 1100 may include program code executable by a circuit and/or a processor core to perform a function(s) unique to each layer.

The storage device 1200 may include a PHY layer 1211, a data link layer 1212, a transaction layer 1213, and an application layer 1215. For example, the layers 1211, 1212, 1213, and 1215 of the storage device 1200 may be included in the controller 1210 of FIG. 1. For example, the layers 1211, 1212, 1213, and 1215 of the storage device 1200 may be implemented as an interface circuit to interface with the host 1100. Each of the layers 1211, 1212, 1213, and 1215 of the storage device 1200 may include program code executable by a circuit and/or a processor core to perform a function(s) unique to each layer.

The layers 1211, 1212, 1213, and 1215 of the storage device 1200 may be operatively and/or physically separated from each other based on transmission to the host 1100 and reception from the host 1100. However, the separation is omitted for ease of illustration.

The PHY layer 1211 may include a communication circuit (e.g., a transmitter/receiver, a modulator/de-modulator, an encoder/decoder, and an oscillator) to transmit and receive a packet. The PHY layer (not illustrated) of the host 1100 may exchange packets with the PHY layer 1211 of the storage device 1200 through the TX line and the RX line. For example, the PHY layer 1211 that is a physical layer may be implemented according to a PHY protocol proposed by the MIPI alliance.

The data link layer 1212 may detect and correct an error of data (or a packet). The transaction layer 1213 may operate in a transaction level (e.g., read or write) and may generate a packet used to perform a transaction such as write or read. For example, the data line layer 1212 and the transaction layer 1213, each of which is a link layer, may be implemented according to a UniPro protocol proposed by the MIPI alliance.

The application layer 1215 that is an upper layer may handle a request from the user of the host 1100 and the storage device 1200. Meanwhile, the PHY layer 1211 and the link and transaction layers 1212 and 1213, each of which is a lower layer, may perform communication with an external device for the application layer 1215.

The application layer 1215 may provide a communication service on the host 1100 and the storage device 1200, based on packets transmitted through the link and transaction layers 1212 and 1213. The application layer 1215 may generate a read request for reading data stored in a host memory (not illustrated) of the host 1100 and a write request for storing data in the host memory (not illustrated) based on a command from the host 1100. In addition, the application layer 1215 may generate a message for informing the host 1100 of various events generated with respect to the storage device 1200. The requests and messages may be processed by the lower layers 1211, 1212, and 1213 and may be transmitted to the host 1100 in the form of the first packet.

Meanwhile, the request scheduler 1214 may order requests generated by the application layer 1215, based on kinds of the requests generated by the application layer 1215. The requests arranged by the ordering may be processed by the lower layers 1211, 1212, and 1213 and the host 1100 based on an order of the arranged requests. Therefore, there may be a need to appropriately determine an order of requests to be processed upon performing mixed workload such as simultaneous performance of read and write operations on the storage device 1200.

That is, to improve the throughput of the two-way communication through the TX line and the RX line, there is a need to efficiently transmit a second packet, which includes write data that are to be stored in the nonvolatile memory 1220 and are received from the host 1100 through the RX line, as well as to efficiently transmit first requests that include read data that are read from the nonvolatile memory 1220 and are to be transmitted to the host 1100 through the TX line.

For example, that a ratio of read requests of requests generated by the application layer 1215 is large means that relatively many write operations are performed on the storage device 1200. In this case, there is a need to increase a ratio of read requests of the first packet transmitted to the host 1100 through the TX line and to decrease a ratio of write requests of the first packet. The host 1100 may transmit the second packet to the storage device 1200 in response to the read requests from the storage device 1200.

In contrast, that a ratio of write requests of requests generated by the application layer 1215 is large means that relatively many read operations are performed on the storage device 1200. In this case, there is a need to increase a ratio of write requests of the first packet transmitted to the host 1100 through the TX line and to decrease a ratio of read requests of the first packet.

Alternatively, the request scheduler 1214 may order requests generated by the application layer 1215, based on responses from the transaction layer 1213. For example, the responses may be included in the second packet received from the host 1100 in response to the first packet. In the case where a term between responses is long, the case means that write data from the host 1100 is received sometimes occasionally. In this case, the request scheduler 1214 may order requests such that a term between responses is shorter.

The request scheduler 1214 according to an embodiment of the disclosure may check types or attributes of requests generated by the application layer 1215 in real time. For example, in the case where a ratio of requests, which have a specific type, of requests generated per unit time is high, the request scheduler 1214 may generate a packet in which a ratio of requests having the specific type is high. A packet mentioned here may correspond to an arrow that is transmitted from the request scheduler 1214 to the transaction layer 1213.

Alternatively, the request scheduler 1214 may check the number of requests generated by the application layer 1215 per unit time, in real time. For example, if the number of requests of the specific type detected per unit time is large, the request scheduler 1214 may order requests such that the detected requests of the specific type are quickly processed by the host 1100. For example, the unit time may be a preset time and may be set in consideration of specifications, resources, etc. of the host 1100 and/or the storage device 1200.

Figure 3:
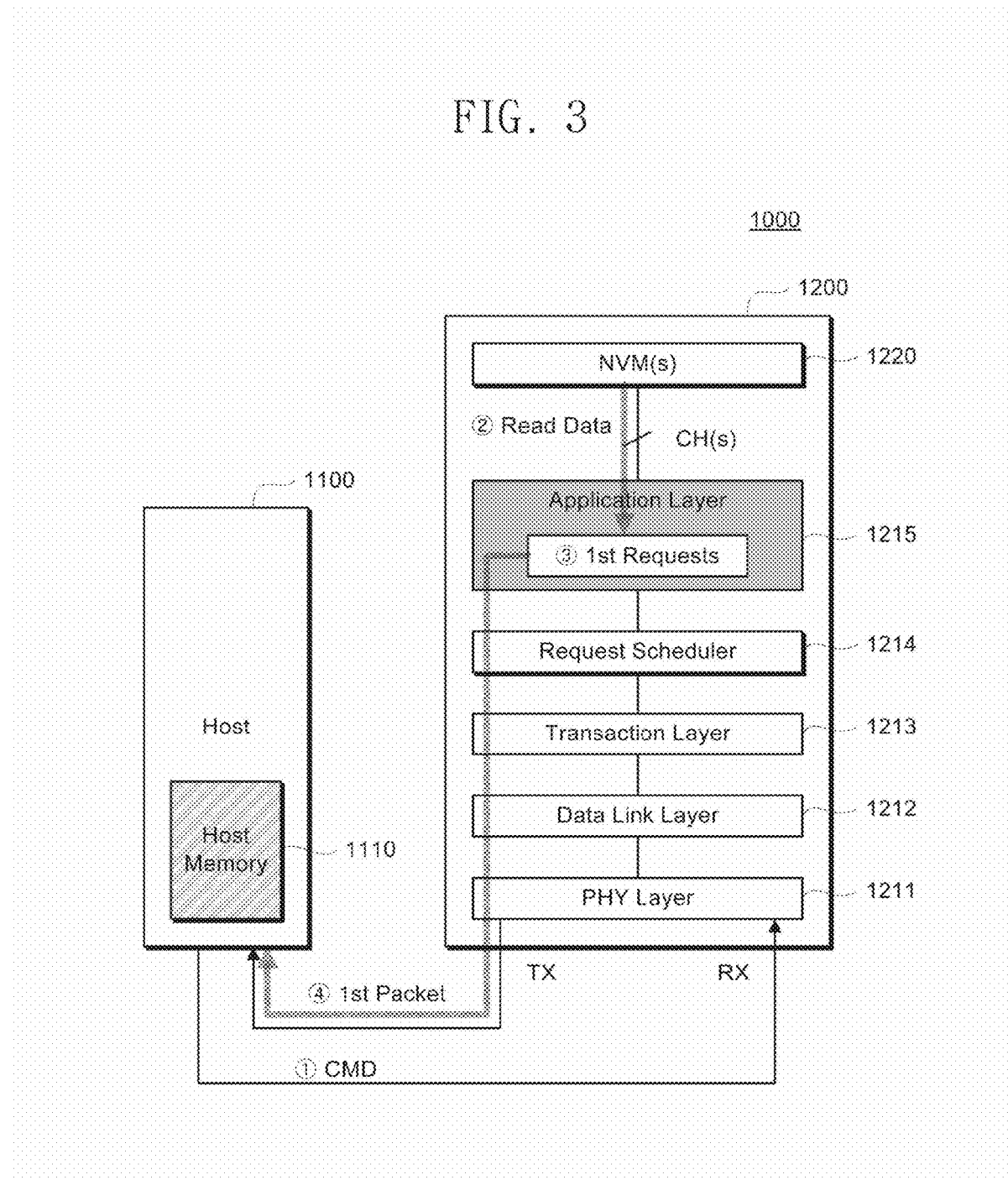
FIG. 3 is a block diagram illustrating an operation of the storage device, according to an embodiment of the disclosure.

FIG. 3 is a block diagram illustrating an operation of the storage device 1200, according to an embodiment of the disclosure. For example, an embodiment is illustrated in FIG. 3 as first requests are generated based on a command CMD from the host 1100 and a first packet is generated based on the first requests.

The storage device 1200 may receive a command CMD from the host 1100 (①). For example, the command CMD may be a read command to read the storage device 1200. The command CMD may be received through the RX line and may be transmitted to the application layer 1215 through the PHY layer 1211, the data link layer 1212, and the transaction layer 1213.

The application layer 1215 may analyze the command CMD. A read operation of the storage device 1200 may be performed by the analyzed command CMD, and read data stored in the nonvolatile memory 1220 may be read (②).

Afterwards, the application layer 1215 may generate first requests corresponding to a kind or attribute of the command CMD (③). In this case, since the command CMD received from the host 1100 is the read command, the first requests may correspond to a write request for the host 1100. For example, the first requests may include the read data read from the nonvolatile memory 1220. For example, each of the first requests may include read data of a unit bit. The first requests may be transmitted to the host 1100 in the form of the first packet after being respectively processed in the transaction layer 1213, the data link layer 1212, and the PHY layer 1211 (④).

Figure 4:
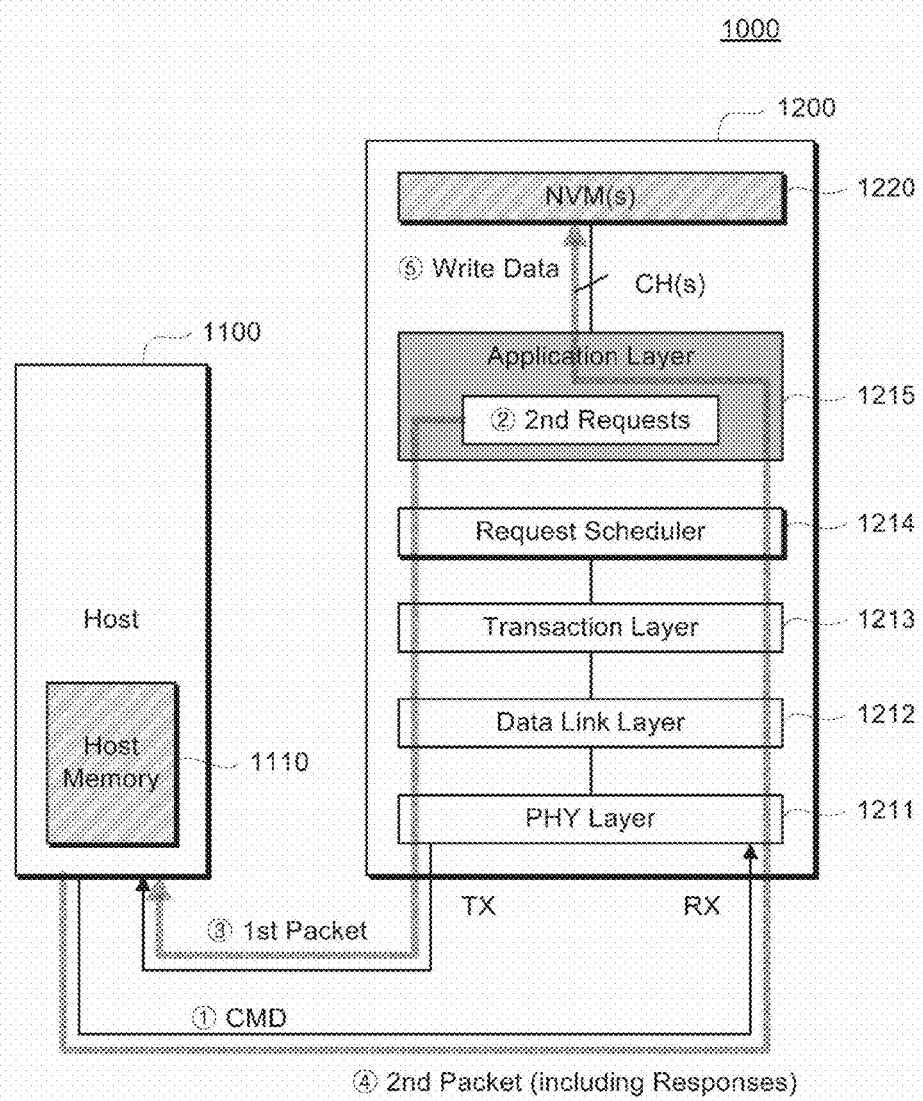
FIG. 4 is a block diagram illustrating an operation of the storage device, according to an embodiment of the disclosure.

FIG. 4 is a block diagram illustrating an operation of the storage device 1200, according to an embodiment of the disclosure. For example, an embodiment is illustrated in FIG. 4 as second requests are generated based on a command CMD from the host 1100, the first packet is generated based on the second requests, and the second packet is received in response to the first packet.

The storage device 1200 may receive a command CMD from the host 1100 (①). For example, the command CMD may be a write command to write data to the storage device 1200. The command CMD may be received through the RX line and may be transmitted to the application layer 1215 through the PHY layer 1211, the data link layer 1212, and the transaction layer 1213.

The application layer 1215 may analyze the command CMD. Afterwards, the application layer 1215 may generate second requests corresponding to a kind or attribute of the command CMD (②) In this case, since the command CMD received from the host 1100 is the write command, the second requests may correspond to a read request for the host 1100. The second requests may be transmitted to the host 1100 in the form of the first packet after being respectively processed in the transaction layer 1213, the data link layer 1212, and the PHY layer 1211 (③). The host 1100 may transmit the second packet to the storage device 1200 in response to the second requests included in the first packet (④). The second packet may be respectively processed in the PHY layer 1211, the data link layer 1212, and the transaction layer 1213, and write data included in the second packet may be stored in the nonvolatile memory 1220 (⑤).

The process of generating requests of different kinds or attributes is described with reference to FIGS. 3 and 4. Unlike the general case that requests generated by the application layer 1215 are transmitted into and processed by the transaction layer 1213, according to an embodiment, the requests may be first ordered by the request scheduler 1214.

Figure 5:
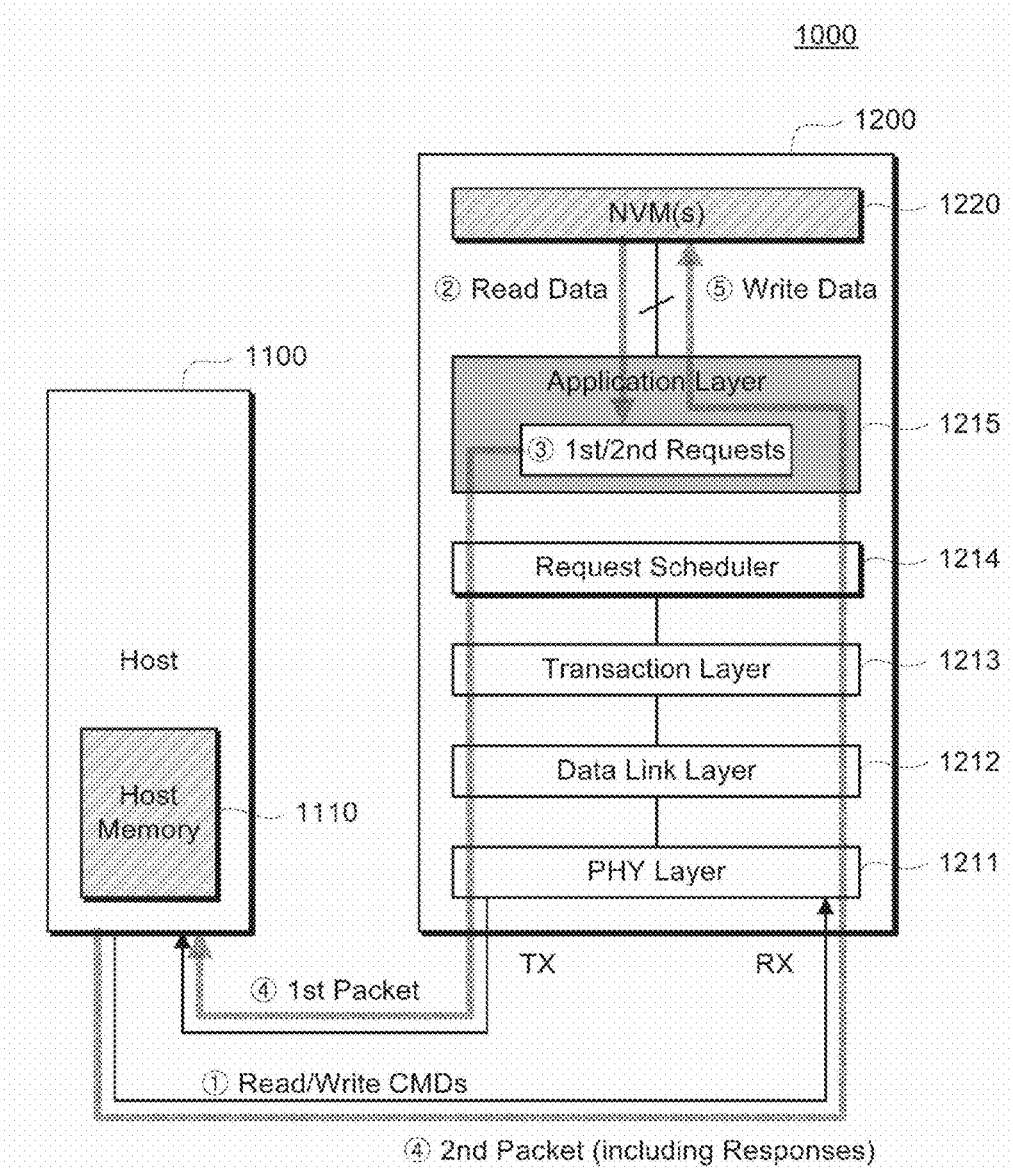
FIG. 5 is a block diagram illustrating an operation of the storage device upon performing a mixed workload on the storage device.

FIG. 5 is a block diagram illustrating an operation of the storage device 1200 upon performing a mixed workload on the storage device 1200. For example, the mixed workload may mean that different types of operations (e.g., a read operation and a write operation) are performed on the storage device 1200.

The application layer 1215 of the storage device 1200 may receive a read command and a write command from the host 1100 (①). The application layer 1215 may generate first requests, which include read data (②) read from the nonvolatile memory 1220, and second requests (③). For example, the first request may be a write request associated with a host memory 1110, and the second request may be a read request for the host memory 1110.

The first requests and the second requests that the application layer 1215 generates may be ordered by the request scheduler 1214 in consideration of a ratio of the second requests to the first requests and/or the number of requests, and the ordered first and second requests may be transmitted to the host 1100 in the form of the first packet after being respectively processed in the lower layers 1213, 1212, and 1211 (④).

The host 1100 may execute the first requests and the second requests included in the first packet. For example, the host 1100 may process read data included in the first request and may provide the processed data to a user. The host 1100 may transmit write data to be stored in the nonvolatile memory 1220 to the storage device 1200 in response to the second requests. For example, the write data to be stored in the nonvolatile memory 1220 may be transmitted to the storage device 1200 in the form of the second packet (⑤). For example, the second packet may include a plurality of strips each including a response (or completion) to the second requests and write data of the unit bit.

Figure 6:
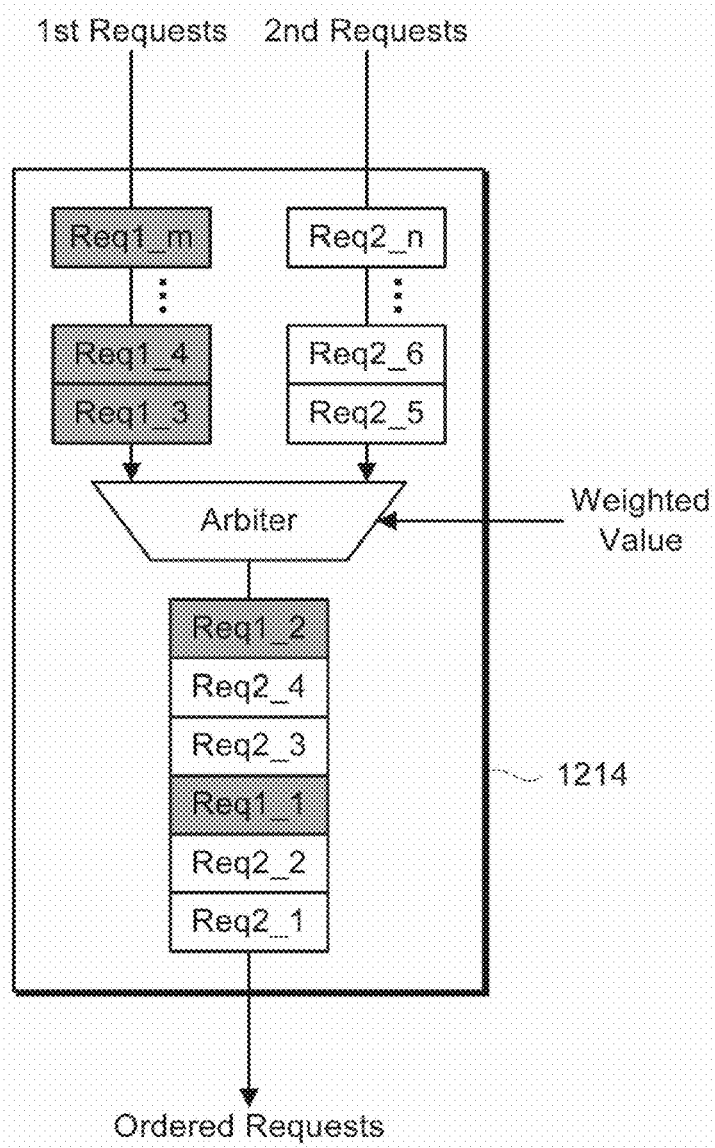
FIG. 6 is a block diagram illustrating a configuration of a request scheduler illustrated in FIGS. 1 to 5.

FIG. 6 is a block diagram illustrating a configuration of the request scheduler 1214 illustrated in FIGS. 1 to 5. The request scheduler 1214 may include an arbiter. To help understand, a description will be given with reference to FIGS. 2 to 5.

The first requests and the second requests that the application layer 1215 generates may be transmitted to the request scheduler 1214. For example, the first requests may include requests Req1_1 to Req1_m. For example, the first requests may be write requests associated with the host 1100. The second requests may include requests Req2_1 to Req2_n. For example, the second requests may be read requests associated with the host 1100.

In a default mode, the request scheduler 1214 may order requests by using a specific algorithm. For example, in the case where a round robin scheduling manner is used, the first request and the second request may be ordered alternately one by one. Since a packet generated according to the ordering is transmitted to the host 1100, the host 1100 may alternately execute the first request and the second request. That is, in the case where the first request is a write request for the host memory 1110 and the second request is a read request for the host memory 1110, the host 1100 may alternately execute the read request and the write request.

According to the general scheduling manner, however, it may be difficult to efficiently cope with an instant variation of requests of a specific kind or type upon performing mixed workloads of different kinds. Accordingly, the arbiter included in the request scheduler 1214 may arrange requests with reference to a ratio that is determined according to kinds or attributes of requests generated by the application layer 1215.

In an embodiment, assuming that the number of second requests is twice the number of first requests, the request scheduler 1214 may order requests such that the number of second requests to be transmitted per unit time is twice the number of first requests to be transmitted per unit time. According to the exemplification, as illustrated in FIG. 6, two second requests Req2_1 and Req2_2 may be output, and then, one first request Req1_1 may be output.

The arbiter included in the request scheduler 1214 may adjust the number of requests of the same kind, which will be continuously output, in real time based on a ratio (i.e., a weighted value) corresponding to a kind or attribute of the requests. For example, if a ratio of first requests to second requests of requests pending in the application layer 1215 is changed into "1:3", the arbiter may arrange the requests such that one first request is output after three second requests are continuously output.

The weighted value may change in real time, and the request scheduler 1214 may order requests based on the weighted value changed in real time. Alternatively, the request scheduler 1214 may adjust the number of times that the weighted value is applied, in consideration of performance, a memory resource, etc. of the storage device 1200. That is, the weighted value may be not applied in real time, but it be applied periodically/randomly.

Figure 7:
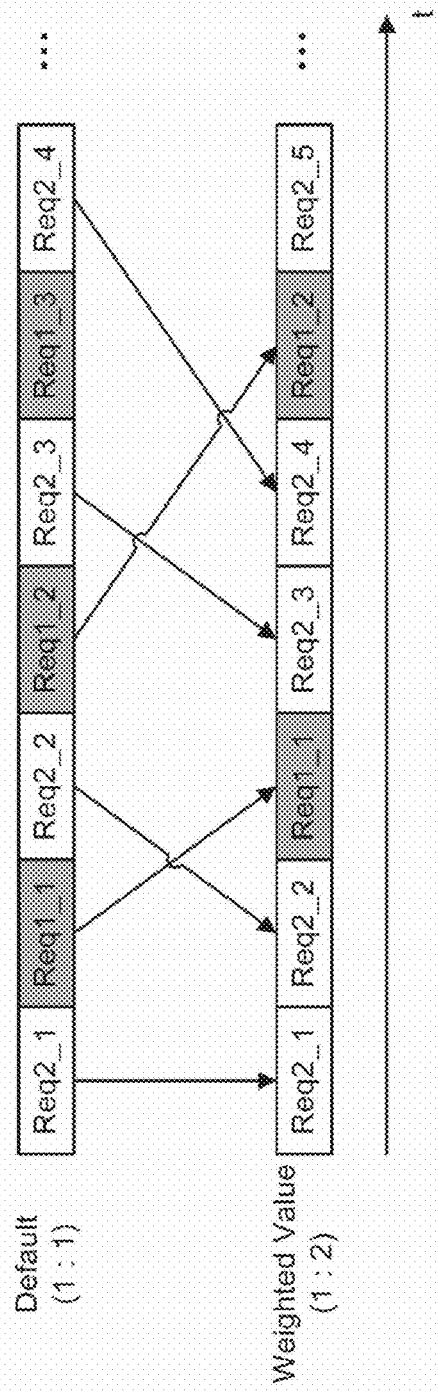
FIG. 7 is a drawing illustrating that requests are ordered by the request scheduler illustrated in FIG. 6.

FIG. 7 is a drawing illustrating that requests are ordered by the request scheduler 1214 illustrated in FIG. 6.

In a default mode, requests may be ordered by a preset scheduling method (e.g., round robin scheduling). The first requests and the second requests may be ordered to be arranged alternately one by one, and thus, a packet in which the first request and the second request are arranged alternately may be generated.

In contrast, in the case where a ratio of the first requests to the second requests of requests pending in the application layer 1215 changes, a weighted value may be applied to order the requests. The weighted value may be measured in the application layer 1215 or from any location in the storage device 1200, at which the packet including the first requests and the second requests is transmitted. For example, in the case where the number of second requests of requests pending in the application layer 1215 is twice the number of first requests pending therein (i.e., a weighted value=1:2), the arbiter may order the requests such that one first request is output for two second requests being output.

Meanwhile, the opposite case may also be possible. For example, in the case where the number of first requests of requests pending in the application layer 1215 is more than the number of second requests of the pending requests, a plurality of first requests may be consecutively arranged.

FIGS. 8A to 8D are drawings illustrating packets exchanged through the TX line and the RX line in FIG. 7. The first packet is a packet transferred to the host 1200 through the TX line, and the second packet is a packet received from the host 1200 through the RX line. Besides elements (first requests, second requests, and strips) illustrated in FIGS. 8A to 8D, other information, such as a cyclical redundancy check (CRC) and a header, may be further added to the first and second packets through processing by the lower layers 1211, 1212, and 1213 constituting the storage device 1200. However, for ease of description, the elements are omitted in FIGS. 8A to 8D. To help understand, a description will be given with reference to FIG. 5.

The first packet may include the first requests and the second requests. The first requests may include requests Req1_1, Req1_2, Req1_3, etc., and the second requests may include requests Req2_1, Req2_2, Req2_3, etc. Each of the first requests Req1_1, Req1_2, Req1_3, etc. may include read data of the unit bit read from the nonvolatile memory 1220. The second packet may include strips Strip1, Strip2, Strip3, etc. Each of the strips Strip1, Strip2, Strip3, etc. may include a response to each of the second requests and write data of the unit bit to be stored in the nonvolatile memory 1220.

Figure 8A:
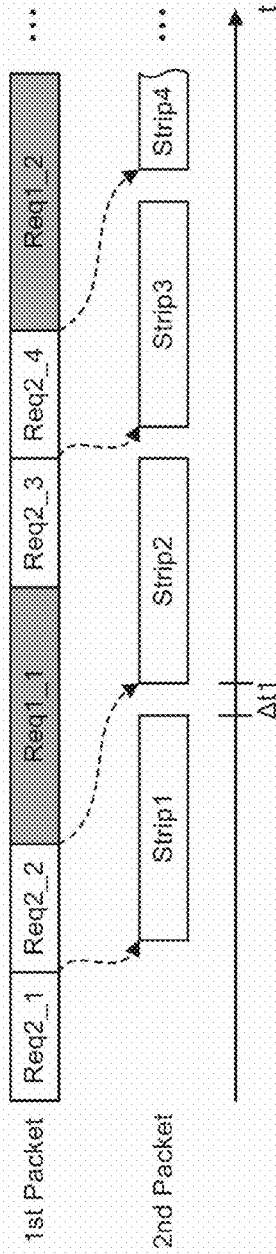

The case that a weighted value is 1:2 is illustrated in FIG. 8A. An example in which the number of second requests pending in the application layer 1215 is twice the number of first requests pending therein is illustrated in FIG. 8A. In this case, as described above, one first request Req1_1 may be transmitted after two second requests Req2_1 and Req2_2 are transmitted. If the request Req2_1 of the second requests of the first packet is processed by the host 1100, the first strip Strip1 may be received through the RX line; as soon as the request Req2_2 of the second requests is processed by the host 1100, the second strip Strip2 may be received through the RX line.

Figure 8B:
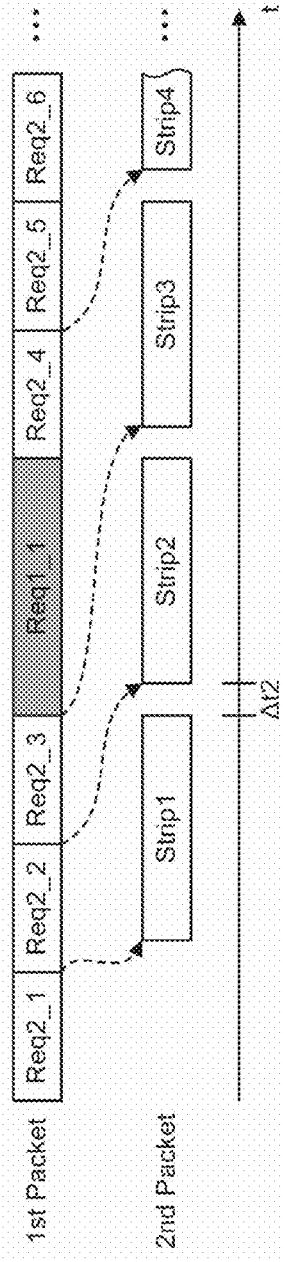

In this case, since no delay exists for receiving strips, the throughput of data exchange through the TX line and the RX line may be improved. A time Δt1 between the first and second strips Strip1 and Strip2 may be a minimum time needed for the host 1100 to process a request. Afterwards, the second requests Req2_3 and Req2_4 and the first request Req1_2 may be processed in a manner similar to the above-described manner The case that a weighted value is 1:3 is illustrated in FIG. 8B. That is, this may correspond to the case that a write operation on the storage device 1200 is performed more than that of the embodiment of FIG. 8A. In this case, one first request Req1_1 may be transmitted after three second requests Req2_1, Req2_2, and Req2_3 are transmitted. A time Δt2 between the first and second strips Strip1 and Strip2 may be substantially the same as the time Δt1 illustrated in FIG. 8A. If the request Req2_1 of the second requests of the first packet is processed by the host 1100, the first strip Strip1 may be received through the RX line; as soon as the request Req2_2 of the second requests is processed by the host 1100, the second strip Strip2 may be received through the RX line. As soon as the request Req2_3 of the second requests is processed by the host 1100, the third strip Strip3 may be received through the RX line.

The case that a weighted value is 2:1 is illustrated in FIG. 8C. Unlike the embodiments described with reference to FIGS. 8A and 8B, the embodiment of FIG. 8C may correspond to the case that relatively many read operations are performed on the storage device 1200.

In this case, since the amount of data to be stored in the nonvolatile memory 1220 is relatively small, a need to reduce an idle time between strips Strip1 and Strip2 including write data to be stored in the nonvolatile memory 1220 may be relatively small. In contrast, to improve read performance of the storage device 1200, there is a need to quickly transmit the first requests Req1_1, Req1_2, Req1_3, etc. including read data. Ordering of requests constituting the first packet illustrated in FIGS. 8A to 8C is an example However, it may be possible to improve transmission efficiency through the TX line by consecutively arranging at least two first requests.

The case that a weighted value is 1:1 is illustrated in FIG. 8D. If a ratio of first requests to second requests of requests pending in the application layer 1215 is 1:1, the scheduling manner is not problematic. However, if the way to transmit is maintained even in the case where a ratio of second requests is relatively great, there is a need to increase efficiency to receive the second packet through the RX line. That is, even though it is possible to minimize an idle time Δt1 between strips illustrated in FIG. 8A, requests are ordered according to a general scheduling scheme (e.g., round robin scheduling), and thus, an idle time Δt3 between strips may increase.

Packets that are exchanged between the host 1100 and the storage device 1200 are described in various embodiments of FIGS. 8A to 8D. For example, a weighted value used to order requests constituting the first packet may be calculated in real time, or the weighted value may be calculated per reference period. The arbiter included in the request scheduler 1214 may order requests received from the application layer 1215 by applying a weighted value in real time or per reference period.

A ratio of first requests to second requests may be measured at various locations of the storage device 1200 to calculate the weighted value. For example, a ratio of first requests to second requests may be measured from requests pending in the application layer 1215, may be measured from requests transmitted from the application layer 1215 to the request scheduler 1214, or may be measured at the lower layers 1213, 1212, and 1211 or at a line between the lower layers 1213, 1212, and 1211.

As such, the throughput of the two-way communication between the host 1100 and the storage device 1200 may be improved by ordering the first requests and the second requests associated with the host 1100 in the application layer 1215.

FIG. 9 is a flowchart for performing the two-way communication between the host 1100 and the storage device 1200, according to an embodiment of the disclosure. To help understand, FIG. 9 will be described with reference to FIGS. 2 to 7.

The storage device 1200 may receive a command, data, etc. from the host 1100 through the RX line and may transmit requests, data, etc. to the host 1100 through the TX line. The controller 1210 may be connected to the nonvolatile memory 1220 through a plurality of channels.

In operation S110, the controller 1210 may receive a command CMD from the host 1100. For example, the command CMD may be composed of a plurality of commands for performing the two-way communication through the TX line and the RX line. For example, the command CMD may include a write command and a read command associated with the nonvolatile memory 1220. The command CMD may be received through the PHY layer 1211 and may be transmitted to the application layer 1215 after being processed in the lower layers 1212 and 1213.

In operation S120, the controller 1210 may generate the first requests and the second requests based on the command CMD. For example, the first requests may be requests that do not induce a response by the host 1100, and the second request may be requests that induce a response by the host 1100. For example, the first requests may be write requests for the host memory 1110 that are generated according to a read command from the host 1100. For example, in the case where the first requests are write requests associated with the host memory 1110, the first requests may include read data read from the nonvolatile memory 1220. For example, the second requests may be read requests for the host memory 1110 that are generated according to a write command from the host 1100.

Although not illustrated in FIG. 9, various requests as well as the first requests and the second requests may be further generated. For example, a message for informing the host 1100 of various events occurring with respect to the storage device 1200 may be further generated. However, since the number of times that the message is generated is smaller than the number of times that the first requests and the second requests are generated and the size of the message is smaller than those of the first and second requests, a description thereof is thus omitted.

In operation S130, the first requests and the second requests may be ordered. For example, the request scheduler 1214 included in the controller 1210 may order requests with reference to a ratio of the first requests to the second requests. For example, the request scheduler 1214 may be appropriately provided in the controller 1210 to order requests generated from the application layer 1215 and to transmit the ordered requests to the lower layers 1213, 1212, and 1211.

For example, in the case where a ratio of the first requests is relatively large, the requests may be arranged such that at least two first requests are consecutively transmitted. In contrast, in the case where a ratio of the second requests is relatively large, the requests may be arranged such that at least two second requests are consecutively transmitted. Afterwards, the ordered requests may be processed to a packet to be transmitted to the host 1100 after being processed by the lower layers 1213 and 1212.

Alternatively, the request scheduler 1214 may order the first requests and the second requests based on the number of requests generated per unit time. For example, if the number of requests of a specific type detected per unit time is large, the request scheduler 1214 may order the first requests and the second requests such that the detected requests of the specific type are quickly processed by the host 1100. For example, if the number of second requests generated per unit time exceeds a reference value, the request scheduler 1214 may order the first requests and the second requests such that at least two or more second requests are continuous.

Alternatively, the request scheduler 1214 may order the first requests and the second requests based on responses included in the second packet received from the host 1100 in response to the first packet. If a period between responses is long, the request scheduler 1214 may order the first requests and the second requests such that the period between responses is shorter.

In operation S140, the first packet including the first requests and the second requests may be transmitted to the host 1100. The first packet may be transmitted through the TX line connecting the host 1100 and the storage device 1200.

In operation S150, the host 1100 may transmit the second packet to the controller 1210 in response to the second requests included in the first packet. For example, the second packet may be received through the RX line connecting the host 1100 and the storage device 1200. For example, in the case where the second request included in the first packet includes a read request for the host 1100, the second packet may include write data to be stored in the nonvolatile memory 1220. For example, the second packet may be composed of a plurality of strips, and each strip may include a response (or completion) corresponding to the first packet and write data of the unit bit. The second packet may be appropriately processed by the lower layers 1211, 1212, and 1213 and the application layer 1215, and then write data which is generated or extracted based on processed second packet may be stored in the nonvolatile memory 1220.

The transmission of the first packet described in operation S140 may be made earlier than the transmission of the second packet described in operation S150. However, afterwards, the transmission of the first packet and the transmission of the second packet may be made at the same time until all requests generated by the controller based on the command CMD are completely executed. That is, the two-way communication may continue until requests are completely executed.

The embodiments of the disclosure may be applied to other manners as well as a manner in which requests are generated based on a command CMD directly received from the host 1100. This will be described with reference to FIG. 10.

Figure 10:
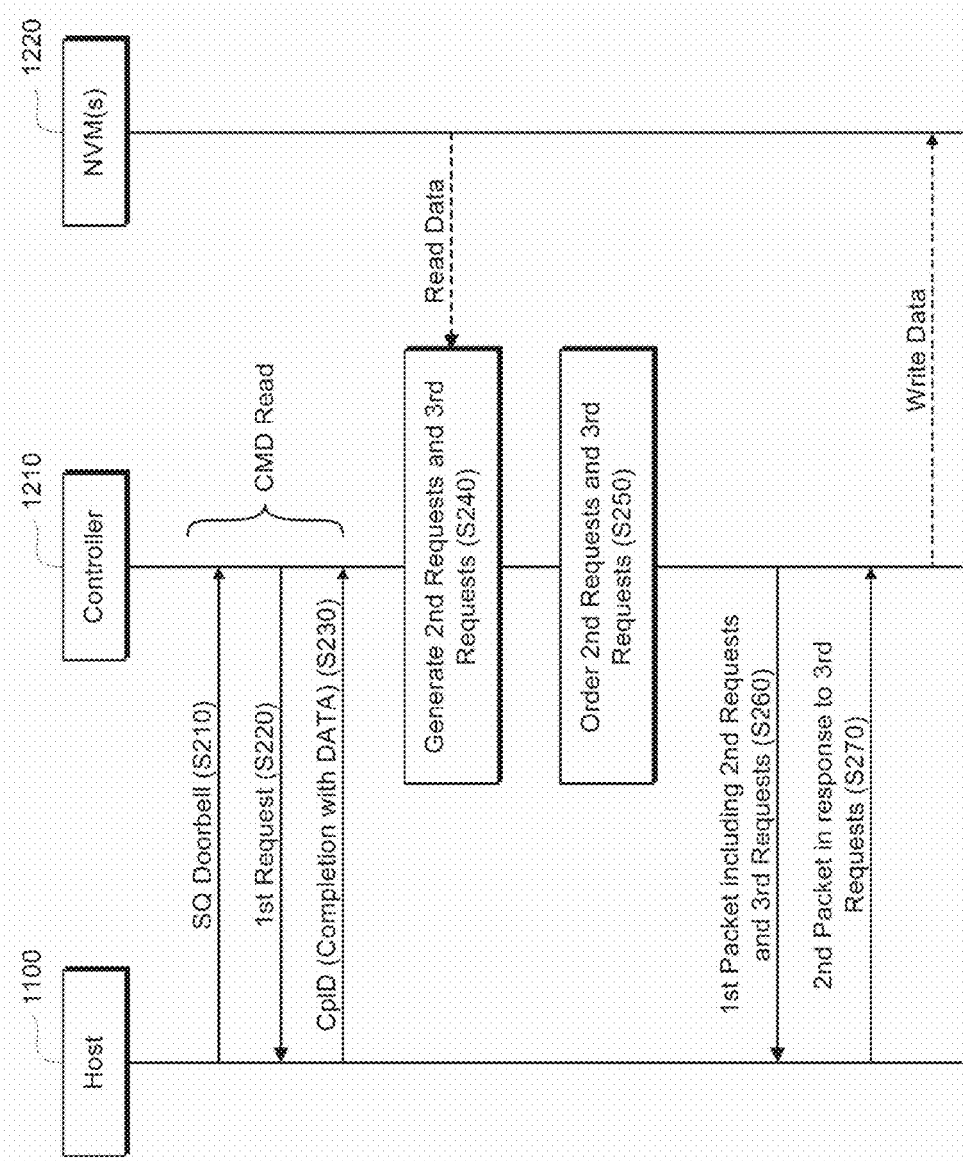
FIG. 10 is a flowchart for performing the two-way communication between the host and the storage device.

FIG. 10 is a flowchart for performing the two-way communication between the host 1100 and the storage device 1200. To help understand, FIG. 10 will be described with reference to FIGS. 2 to 8. For ease of description, contents that are the same as that described with reference to FIG. 9 are omitted or are briefly described.

In operation S210, the controller 1210 may receive a submission queue (SQ) doorbell from the host 1100. The submission queue doorbell may be a signal providing notification that a command is generated in the host 1100.

In operation S220, the controller 1210 may generate a first request and may transmit the first request to the host 1100. For example, the first request may be a signal for requesting the host 1100 to transmit a command or data to the controller 1210.

In operation S230, the host 1100 may generate completion with DATA (CpID) and may transmit the CpID to the controller 1210. The CpID may include a response to the first request from the controller 1210 and a command corresponding to the first request.

In operation S240, the controller 1210 may generate second requests and third requests based on the command CMD. For example, the second requests may be write requests of the host memory 1110 that are generated according to a read command of the nonvolatile memory 1220 received from the host 1100. In this case, the second requests may include read data read from the nonvolatile memory 1220. For example, the third requests may be read requests of the host memory 1110 that are generated according to a write command of the nonvolatile memory 1220 received from the host 1100.

In operation S250, the second requests and the third requests may be ordered based on a ratio of the second requests to the third requests, the number of requests generated per unit time, or strips/responses included in the second packet received from the host 1100.

In operation S260, the first packet including the second requests and the third requests may be transmitted to the host 1100.

In operation S270, the host 1100 may transmit the second packet to the controller 1210 in response to the third requests included in the first packet. For example, in the case where the third requests included in the first packet include a read request for the host 1100, the second packet may include write data to be stored in the nonvolatile memory 1220. For example, the second packet may be composed of a plurality of strips, and each strip may include a response (or completion) corresponding to the first packet and write data of the unit bit.

Figure 11:
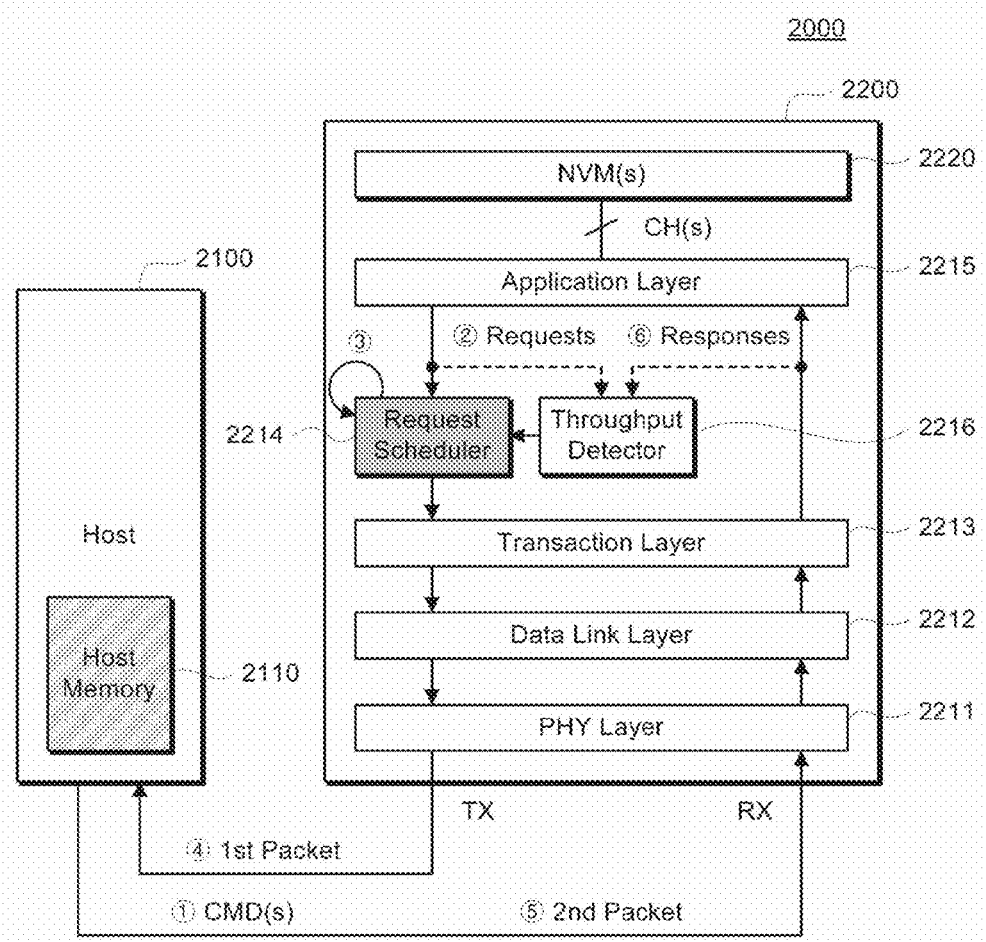
FIG. 11 is a block diagram illustrating a configuration of the storage device illustrated in FIG. 1.

FIG. 11 is a block diagram illustrating a configuration of the storage device 1200 illustrated in FIG. 1. An embodiment is illustrated in FIG. 11 as a storage system 2000 includes a host 2100 and a storage device 2200.

The storage device 2200 may include a controller composed of layers 2211, 2212, 2213, and 2215 and a nonvolatile memory 2220. The layers 2211, 2212, 2213, and 2215 may respectively correspond to the layers 1211, 1212, 1213, and 1215 described with reference to FIG. 2, and functions of the layers 2211, 2212, 2213, and 2215 are substantially the same as those of the layers 1211, 1212, 1213, and 1215. The storage device 2200 may further include a request scheduler 2214 and a throughput detector 2216.

If a command CMD is received from the host 2100 (①), the application layer 2215 may generate requests corresponding to the command CMD (②). For example, the requests may include first requests and second requests having different kinds or attributes. For example, in the case where the command CMD is a read command associated with the storage device 2200, a first request that is generated in response to the read command may be a write request for the host 2100.

For example, in the case where the command CMD is a write command associated with the storage device 2200, a second request that is generated in response to the write command may be a read request for the host 2100.

Before the request scheduler 2214 orders requests, the throughput detector 2216 may calculate a weighted value that is used to order the requests. For example, the throughput detector 2216 may calculate a weighted value based on a result of calculating a ratio of the first requests to the second requests of requests pending in the application layer 2215. Alternatively, the throughput detector 2216 may calculate a weighted value based on the number of requests, which are detected per unit time, of the requests pending in the application layer 2215. Alternatively, the throughput detector 2216 may calculate a weighted value based on a reception frequency of responses included in the second packet received from the host 2100 (⑥).

The request scheduler 2214 may order requests based on the calculation result of the throughput detector 2216 (③). For example, in the case where a ratio of the second requests is relatively great, at least two first requests may be consecutively transmitted such that the host 2100 rapidly processes the second requests. For example, if the number of requests of a specific type detected per unit time exceeds a reference value, the first requests and the second requests may be ordered such that the requests of the specific type are quickly processed by the host 1100. For example, if a term between strips (or responses) included in the second packet exceeds a reference value or a reception frequency of strips (or responses) included in the second packet exceeds a reference value, the first requests and the second requests may be ordered such that the second requests are quickly processed. Here, the above-described three reference values may be different from each other.

The requests ordered by the request scheduler 2214 may be transmitted to the host 2100 in the form of the first packet after being processed by the lower layers 2213, 2212, and 2211 (④).

The host 2100 may process the requests included in the first packet. For example, in the case where the first requests included in the first packet are write requests associated with the host 2100, read data that are included in the first requests and are read from the nonvolatile memory 2220 may be stored in a host memory 2110. For example, in the case where the second requests included in the first packet are read requests associated with the host 2100, the host 2100 may transmit responses corresponding to the second requests and write data to be stored in the nonvolatile memory 2220 to the storage device 2200 in the form of the second packet (⑤).

The second packet may be processed by the layers 2211, 2212, and 2213, and the responses included in the second packet may be transmitted to the application layer 2215 and may be detected by the throughput detector 2216. The detected responses may be used for the request scheduler 2214 to order requests.

Figure 12:
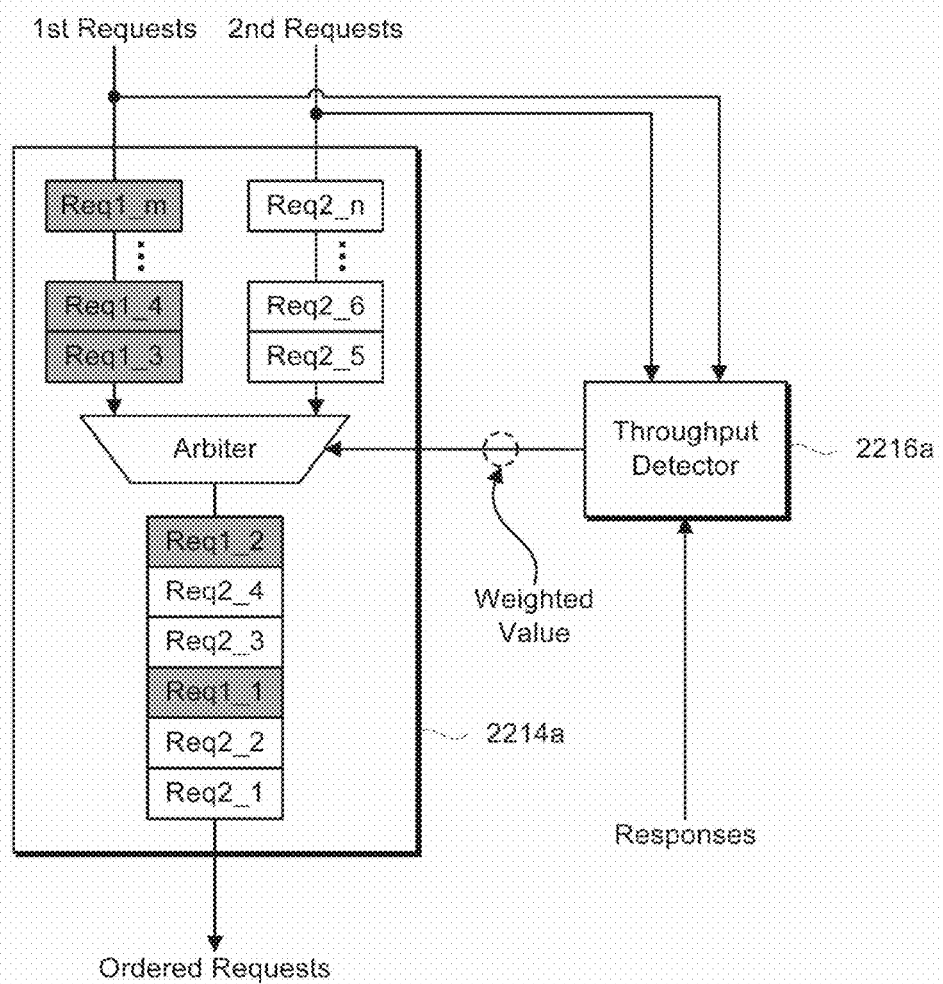
FIG. 12 is a block diagram illustrating a configuration of the request scheduler and a throughput detector illustrated in FIG. 11.

FIG. 12 is a block diagram illustrating a configuration of the request scheduler and the throughput detector illustrated in FIG. 11. A request scheduler 2214a may include an arbiter. Like the request scheduler 2214a, a throughput detector 2216a may be implemented with a separate hardware circuit. However, in some embodiments, a function of the throughput detector 2216a may be integrated in the request scheduler 2214a. In this case, the request scheduler 2214a and the throughput detector 2216a may be implemented with one hardware, circuit, or function block. Alternatively, the throughput detector 2216a may be implemented by software. This will be described with reference to FIG. 16. To help understand, FIG. 12 will be described with reference to FIG. 11.

The first requests and the second requests that the application layer 2215 generates may be transmitted to the request scheduler 2214a and the throughput detector 2216a. The first requests may include requests Req1_1 to Req1_$m$ and may be write requests associated with the host 2100. The second requests may include requests Req2_1 to Req2_$n$ and may be read requests associated with the host 2100.

The throughput detector 2216a may calculate a weighted value based on a ratio of the first requests to the second requests of requests pending in the application layer 2215, the number of requests of a specific type, or a reception frequency of strips (or responses) included in the second packet. For example, if the number of the second requests is twice the number of the first requests, the weighted value may be 1:2.

The arbiter included in the request scheduler 2214a may order requests with reference to the weighted value from the throughput detector 2216a. For example, requests may be ordered according to the calculated weighted value such that one first request is transmitted whenever two second requests are transmitted.

For example, the throughput detector 2216a may calculate the weight value in real time. The request scheduler 2214a may order requests by applying the calculated weighted value in real time. Alternatively, the throughput detector 2216a may calculate a weighted value periodically/randomly in consideration of performance, resources, etc. of the storage device 2200. The request scheduler 2214a may order requests by applying the calculated weighted value in real time periodically/randomly.

Meanwhile, a ratio of the first requests to the second requests of the requests may be detected at various locations of the storage device 2200. One of the above-described examples will be described with reference to FIG. 13.

Figure 13:
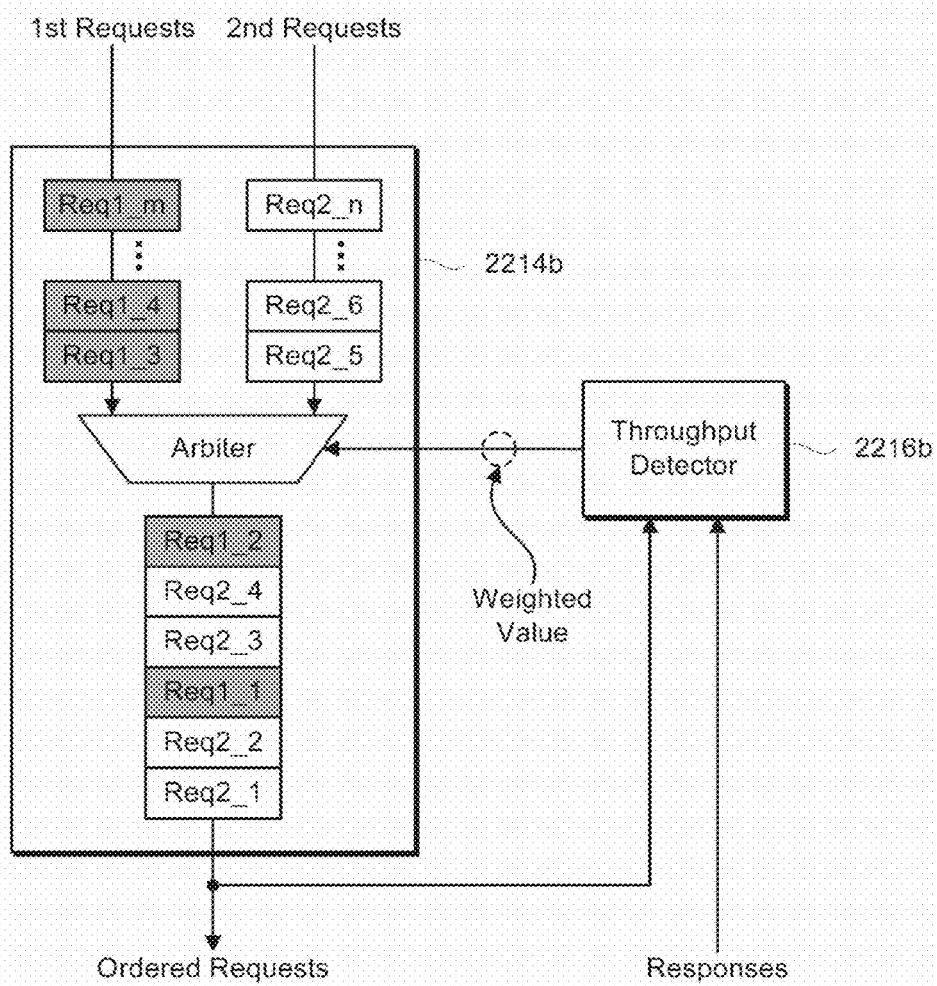
FIG. 13 is a block diagram illustrating another configuration of the request scheduler and the throughput detector illustrated in FIG. 11.

FIG. 13 is a block diagram illustrating another configuration of the request scheduler and the throughput detector illustrated in FIG. 11. A request scheduler 2214b may include an arbiter. Basic configurations and functions of the request scheduler 2214b and a throughput detector 2216b are the same as those of the embodiment described with reference to FIG. 12 except a detection location of the throughput detector 2216b is changed. Thus, a duplicated description thereof may not be repeated here.

The throughput detector 2216b may detect ordered requests output from the request scheduler 2214b. For example, the throughput detector 2216b may calculate a weighted value based on a ratio of first requests to second requests of the ordered requests or the number of requests of a specific type. A weighted value may be calculated in real time or periodically/randomly, and the calculated weighted value may be transmitted to an arbiter included in the request scheduler 2214b in real time or periodically/randomly.

Figure 14:
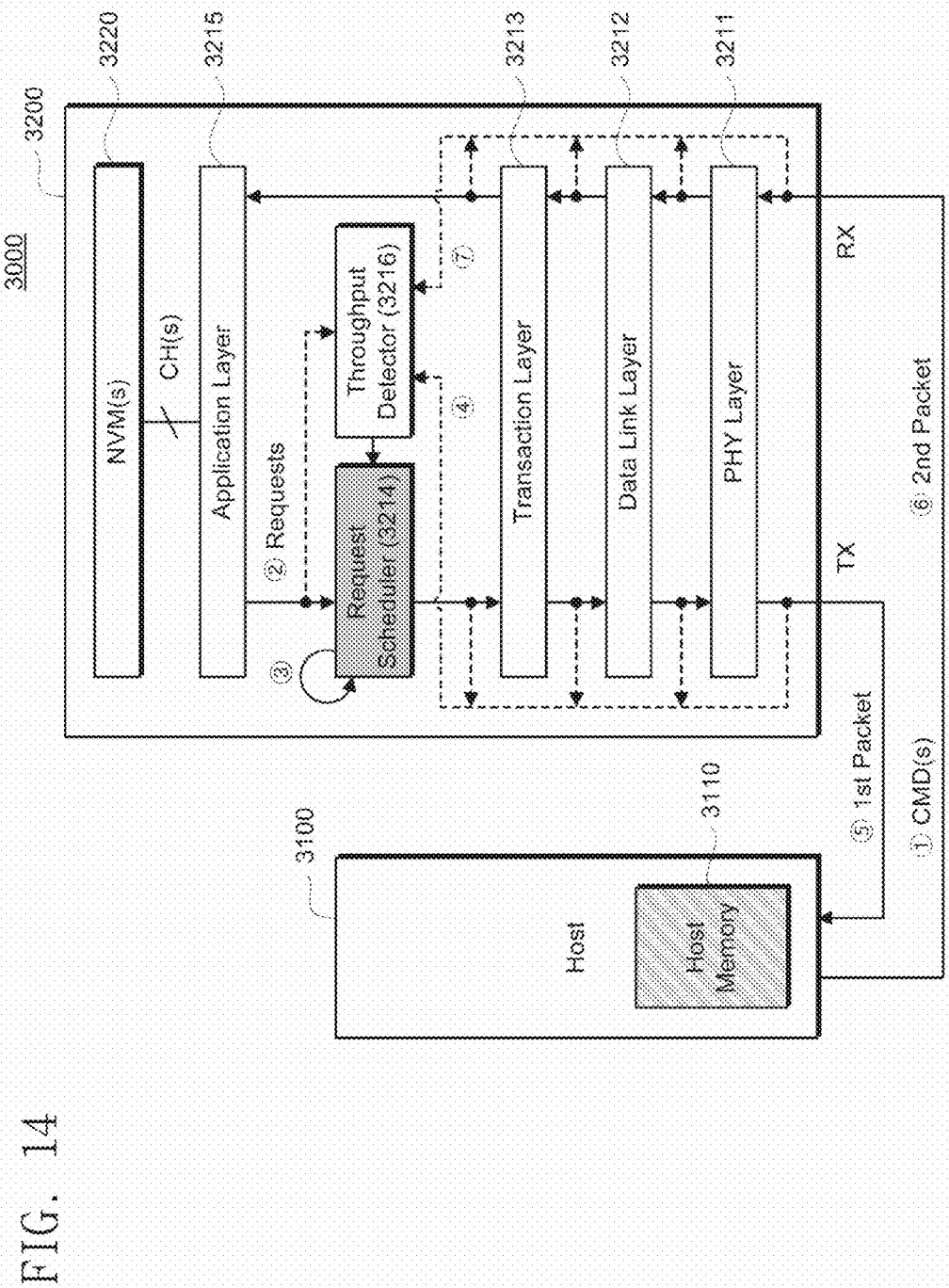
FIG. 14 is a block diagram illustrating a configuration of the storage device illustrated in FIG. 1.

FIG. 14 is a block diagram illustrating a configuration of the storage device 1200 illustrated in FIG. 1. An embodiment is illustrated in FIG. 14 as a storage system 3000 that includes a host 3100 and a storage device 3200.

The storage device 3200 may include a controller composed of layers 3211, 3212, 3213, and 3215 and a nonvolatile memory 3220. The layers 3211, 3212, 3213, and 3215 may respectively correspond to the layers 1211, 1212, 1213, and 1215 described with reference to FIG. 2, and functions of the layers 2211, 2212, 2213, and 2215 are substantially the same as those of the layers 1211, 1212, 1213, and 1215. The storage device 3200 may further include a request scheduler 3214 and a throughput detector 3216.

If commands CMD are received from the host 3100 (①), the application layer 3215 may generate requests corresponding to the commands CMD (②). For example, in the case where the command CMD is a read command associated with the storage device 3200, a first request that is generated in response to a read command may be a write request for the host 3100. For example, in the case where the command CMD is a write command associated with the storage device 3200, a second request that is generated in response to the write command may be a read request for the host 3100.

Before the request scheduler 3214 orders requests, the throughput detector 3216 may calculate a weighted value that is used to order the requests. For example, the throughput detector 3216 may calculate a weighted value based on a ratio of the first requests to the second requests of requests pending in the application layer 3215. Alternatively, the throughput detector 3216 may calculate a weighted value based on the number of requests, which are detected per unit time, of the requests pending in the application layer 3215. Alternatively, the throughput detector 3216 may calculate a weighted value based on a reception frequency of responses included in the second packet received from the host 3100.

Besides, the throughput detector 3216 may calculate a weighted value based on information detected at various locations of the storage device 3200. For example, the throughput detector 3216 may calculate a weighted value based on ordered requests output from the request scheduler 3216, requests output from the transaction layer 3213 or pending in the transaction layer 3213, requests pending in the data link layer 3212 or output from the data link layer 3212, or requests pending in the PHY layer 3211 or output from the PHY layer 3211 (④).

In addition, the throughput detector 3216 may calculate based on responses included in the second packet input to the PHY layer 3211, responses pending in the PHY layer 3211 or included in the second packet output from the PHY layer 3211, responses pending in the data link layer 3212 or included in the second packet output from the data link layer 3212, or responses pending in the transaction layer 3213 or included in the second packet output from the transaction layer 3213 (⑦).

An additional configuration may be further included in the storage device 3200 such that the throughput detector 3216 detects requests at various locations of the storage device 3200. For example, a switch that selects any one of the above-described locations and makes it possible to detect requests at the selected location may be further provided in the storage device 3200.

The request scheduler 3214 may order requests based on the weighted value calculated by the throughput detector 3216 (③).

The requests ordered by the request scheduler 3214 may be processed by lower layers 3213, 3212, and 3211, and the requests may be detected by the throughput detector 3216 during the process (④). Afterwards, the ordered requests may be transmitted to the host 3100 in the form of the first packet (⑤).

The host 3100 may process the requests included in the first packet. For example, in the case where the first requests included in the first packet are write requests associated with the host 3100, read data that are included in the first requests and are read from the nonvolatile memory 3220 may be stored in a host memory 3110. For example, in the case where the second requests included in the first packet are read requests associated with the host 3100, the host 3100 may transmit responses corresponding to the second requests and write data to be stored in the nonvolatile memory 3220 to the storage device 3200 in the form of the second packet (⑥). In this process, the responses included in the second packet may be detected by the throughput detector 3216 (⑦).

Figure 15:
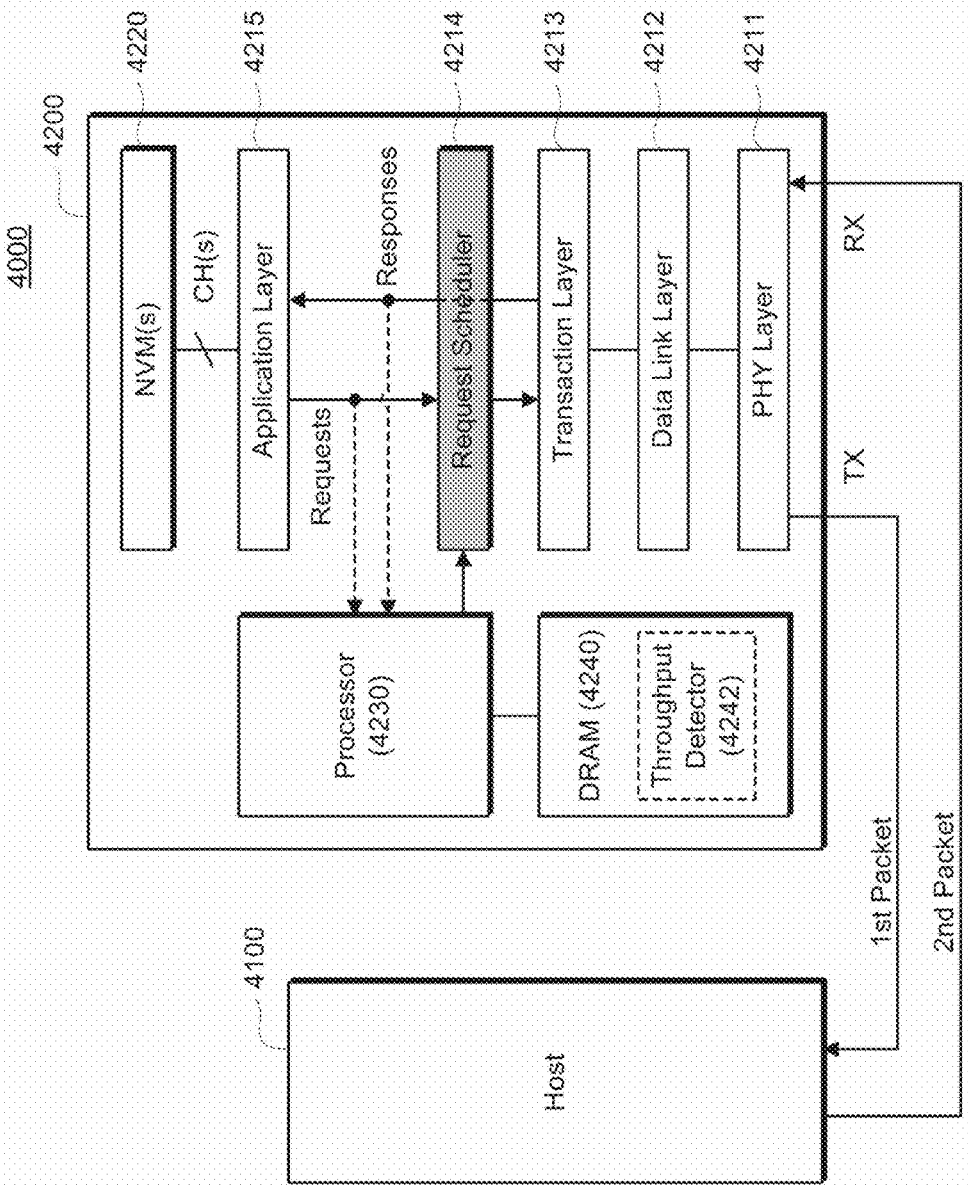
FIG. 15 is a block diagram illustrating a configuration of the storage device illustrated in FIG. 1.

FIG. 15 is a block diagram illustrating a configuration of the storage device illustrated in FIG. 1. An embodiment is illustrated in FIG. 15 as a storage system 4000 that includes a host 4100 and a storage device 4200. This embodiment will be described under the assumption that a throughput detector 4242 is implemented by software.

The storage device 4200 may include a controller including layers 4211, 4212, 4213, and 4215 and a nonvolatile memory 4220. The controller may further include a processor 4230 and a DRAM 4240.

The processor 4230 may be configured to drive the throughput detector 4242. For example, the throughput detector 4242 may be software or firmware that is configured to perform the same function as a throughput detector described with reference to FIGS. 1 to 14. For example, the throughput detector 4242 may be stored in the nonvolatile memory 4220 and may be loaded onto the DRAM 4240 for driving. Alternatively, the throughput detector 4242 may be stored and driven in a separate ROM (not illustrated). The throughput detector 4242 is illustrated as being loaded onto the DRAM 4240. However, embodiments of the disclosure may not be limited thereto.

The application layer 4215 may generate different types of requests based on a command from the host 4100. For example, the first requests may be write requests associated with the host 4100, which include read data read from the nonvolatile memory 4220. The second requests may be read requests associated with the host 4100. Before the requests are ordered by the request scheduler 4214, the requests may be transmitted to the processor 4230.

The throughput detector 4242 may calculate a weighted value that is used to order the requests. For example, the throughput detector 4242 may calculate a weighted value based on a ratio of the first requests to the second requests of the requests or the number of requests. Although not illustrated in FIG. 15 for ease of illustration, the throughput detector 4242 may calculate a weighted value based on requests respectively output from the layers 4211, 4212, 4213, and 4215 or requests pending in the respective layers 4211, 4212, 4213, and 4215, as illustrated in FIG. 14.

The request scheduler 4214 may order requests based on the weighted value, and the requests may be transmitted to the host 4100 in the form of the first packet after being processed by the layers 4211, 4212, and 4213.

The host 4100 may generate the second packet in response to the second request included in the first packet. For example, the second packet may include a response to the second request and write data to be stored in the nonvolatile memory 4220.

In a process in which the second packet is received by the storage device 4200, also, the throughput detector 4242 may calculate a weighted value used to order the requests. For example, the throughput detector 4242 may calculate a weighted value based on a reception frequency of responses included in the second packet. Although not illustrated in FIG. 15 for ease of illustration, the throughput detector 4242 may calculate a weighted value based on responses respectively output from the layers 4211, 4212, 4213, and 4215 or responses pending in the respective layers 4211, 4212, 4213, and 4215, as illustrated in FIG. 14.

An operating method of a storage device according to an embodiment of the disclosure is described above. According to an embodiment of the disclosure, in a storage device that performs the two-way communication with a host, requests may be ordered according to a ratio of requests of different kinds (or attributes) of requests associated with the host. Since requests are ordered such that requests of a kind more generated by a controller (in more detail, an application layer) are processed by the host more quickly, the throughput may be improved in the two-way communication through the TX line and the RX line connected to the host.

Figure 16:
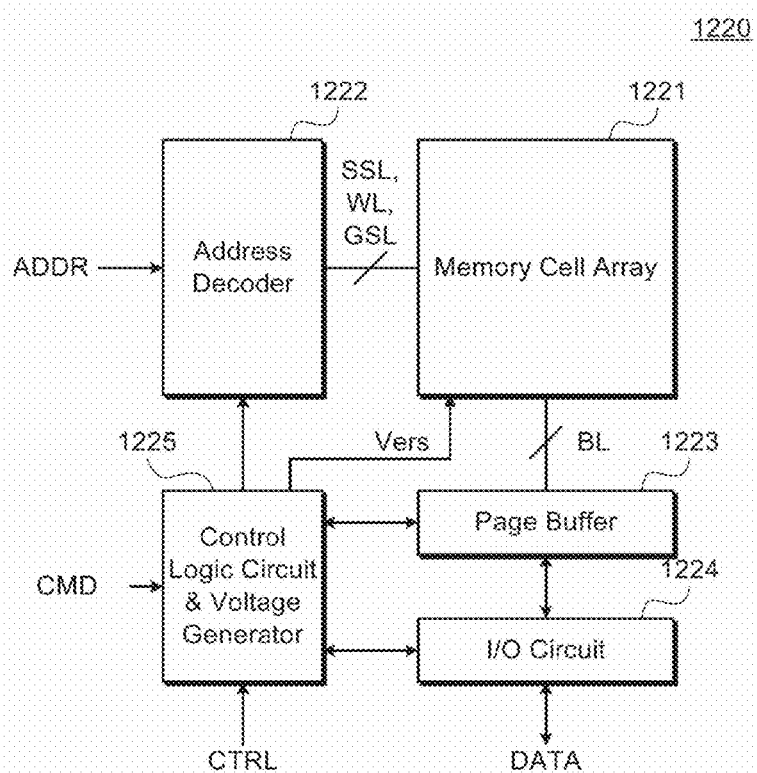
FIG. 16 is a block diagram illustrating a nonvolatile memory illustrated in FIG. 1.

FIG. 16 is a block diagram illustrating the nonvolatile memory 1220 illustrated in FIG. 1. Referring to FIG. 16, the nonvolatile memory 1220 may include a memory cell array 1221, an address decoder 1222, a page buffer 1223, an input/output circuit 1224, and a control logic and voltage generator 1225.

The memory cell array 1221 may include a plurality of memory blocks. Each of the memory blocks may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits.

The address decoder 1222 may be connected with the memory cell array 1221 through the word lines WL, string selection lines SSL, and ground selection lines GSL The address decoder 1222 may receive a logical address from the outside, may decode the received logical address, and may drive the word lines WL. For example, an address ADDR may be a physical address of the nonvolatile memory 1220 which is obtained by converting the logical address. The above-described address conversion operation may be performed by a controller (e.g., 1210 of FIG. 1) according to an embodiment of the disclosure or by a flash translation layer (FTL) which is driven by the controller 1210.

The page buffer 1223 may be connected to the memory cell array 1221 through the bit lines BL. Under control of the control logic and voltage generator circuit 1225, the page buffer 1223 may control the bit lines BL such that data provided from the input/output circuit 1224 is stored in the memory cell array 1221. Under control of the control logic and voltage generator circuit 1225, the page buffer 1223 may read data stored in the memory cell array 1221 and may provide the read data to the input/output circuit 1224. For example, the page buffer 1223 may be provided with data from the input/output circuit 1224 by the page or may read data from the memory cell array 1221 by the page.

The input/output circuit 1224 may receive data, DATA, from the external device and may transfer the received data to the page buffer 1223.

The control logic and voltage generator circuit 1225 may control the address decoder 1222, the page buffer 1223, and the input/output circuit 1224 in response to a command CMD and a control signal CTRL from the outside. For example, the control logic and voltage generator circuit 1225 may control other components in response to the signals CMD and CTRL such that data is stored in the memory cell array 1221. Alternatively, the control logic and voltage generator circuit 1225 may control other components in response to the signals CMD and CTRL such that data stored in the memory cell array 1221 is transmitted to the external device. The control signal CTRL may be a signal which the controller 1210 provides to control the nonvolatile memory 1220.

The control logic and voltage generator circuit 1225 may generate various voltages Vers needed for the nonvolatile memory 1220 to operate. For example, the control logic and voltage generator circuit 1225 may generate a plurality of program voltages, a plurality of pass voltages, a plurality of verification voltages, a plurality of selection read voltages, a plurality of non-selection read voltages, a plurality of erase voltages, and the like. The control logic and voltage generator circuit 1225 may provide the generated voltages to the address decoder 1222 or to a substrate of the memory cell array 1221.

FIG. 17 is a circuit diagram illustrating one of memory blocks included in a memory cell array in FIG. 16. In an embodiment, a memory block BLK of a three-dimensional structure will be described with reference to FIG. 17.

Referring to FIG. 17, the memory block BLK may include a plurality of cell strings CS11, CS12, CS21, and CS22. The cell strings CS11, CS12, CS21, and CS22 may be arranged along a row direction and a column direction to form rows and columns.

For example, the cell strings CS11 and CS12 may be connected to string selection lines SSL1a and SSL1b to constitute a first row. The cell strings CS21 and CS22 may be connected to string selection lines SSL2a and SSL2b to constitute a second row.

For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include a plurality of cell transistors. Each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In an embodiment, each of the memory cells included in the cell strings CS11, CS12, CS21, and CS22 may be a charge trap flash (CTF) memory cell.

The memory cells MC1 to MC8 may be serially connected and may be stacked in a height direction being a direction perpendicular to a plane defined by the row direction and the column direction. In each cell string, the string selection transistors SSTa and SSTb may be serially connected and may be arranged between the memory cells MC1 to MC8 and a bit line BL1 or BL2. In each cell string, the ground selection transistors GSTa and GSTb may be serially connected and may be arranged between the memory cells MC1 to MC8 and a common source line CSL.

In an embodiment, in each cell string, a first dummy memory cell DMC1 may be arranged between the memory cells MC1 to MC8 and the ground selection transistors GSTa and GSTb. In an embodiment, in each cell string, a second dummy memory cell DMC2 may be arranged between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In an embodiment, ground selection transistors in the same row may be connected to the same ground selection line, and ground selection transistors in different rows may be connected to another ground selection line. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In an embodiment, even though not illustrated in FIG. 17, ground selection transistors provided at the same height from a substrate (not illustrated) may be connected to the same ground selection line, and ground selection transistors provided at different heights may be connected to different ground selection lines. For example, in the cell strings CS11, CS12, CS21, and CS22, the first ground selection transistors GSTa may be connected to the first ground selection line, and the second ground selection transistors GSTb may be connected to the second ground selection line.

Memory cells arranged at the same height from the substrate (or the ground selection transistors GSTa and GSTb) may be connected in common to the same word line, and memory cells arranged at different heights therefrom may be connected to different word lines. For example, memory cells MC1 to MC8 of the cell strings CS11, CS12, CS21, and CS22 may be connected respectively to first to eighth word lines WL1 to WL8.

String selection transistors, which belong to the same row, from among the first string selection transistors SSTa arranged at the same height may be connected to the same string selection line, and string selection transistors, which belong to different rows, from among the first string selection transistors SSTa may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

String selection transistors, which belong to the same row, from among the second string selection transistors SSTb arranged at the same height may be connected to the same string selection line, and string selection transistors, which belong to different rows, from among the second string selection transistors SSTb may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Even though not illustrated, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an embodiment, dummy memory cells at the same height may be connected with the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the memory block BLK, read and write operations may be performed in units of rows. For example, a row of the first memory block BLK may be selected by the string selection lines SSL1a, SSL1b, SSL2a, and SSL2b.

For example, the cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. Memory cells, which are arranged at the same height, from among memory cells in cell strings connected to the driven word line may be selected by driving a word line. Read and write operations may be performed with respect to the selected memory cells. The selected memory cells may constitute a physical page unit.

In the memory block BLK, memory cells may be erased in units of a memory block or a sub-block. When an erase operation is performed in units of memory blocks, all memory cells MC in the memory block BLK may be simultaneously erased according to an erase request. When the erase operation is performed in units of sub-blocks, some of memory cells MC in the memory block BLK may be simultaneously erased according to an erase request while the remaining memory cells thereof may be erase-inhibited. A low voltage (e.g., a ground voltage) may be supplied to a word line connected to erased memory cells, and a word line connected to erase-inhibited memory cells MC may be floated.

In an embodiment, the memory block BLK illustrated in FIG. 17 is only an example. The number of cell strings may increase or decrease, and the number of rows of cell strings and the number of columns of cell strings may increase or decrease according to the number of cell strings. In the memory block BLK, the number of cell transistors (GST, MC, DMC, SST, etc.) may increase or decrease, and a height of the memory block BLK may increase or decrease according to the number of cell transistors (GST, MC, DMC, SST, etc.). Furthermore, the number of lines (GSL, WL, DWL, SSL, etc.) connected with transistors may increase or decrease according to the number of the transistors.

According to an embodiment of the disclosure, requests may be ordered with reference to requests generated by a controller of a storage device or responses received from a host in response to requests. Accordingly, it may be possible to improve throughput of two-way communication with the host.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to embodiments, it will be apparent to those skilled in the art that various changes and modifications may be made without departing from the spirit and scope of the disclosure. Therefore, it should be understood that the above embodiments are not limiting, but illustrative.

What is claimed is:

1. A storage device that is configured to perform two-way communication with a host, the storage device comprising:
   a nonvolatile memory device; and
   a controller configured to:
      receive at least one first command and at least one second command from the host,
      in response to the at least one first command, receive read data from the nonvolatile memory device,
      generate first requests which include the read data, the first requests being write requests for a host memory of the host,
      in response to the at least one second command, generate second requests which are read requests for the host memory,
      generate a first packet which
      includes at least one first request from among the first requests and at least two consecutive second requests from among the second requests,
      transmit the first packet to the host, and
      receive a second packet from the host, the second packet including responses to the at least two consecutive second requests and write data to be stored in the nonvolatile memory device.

2. The storage device of claim 1, wherein before generating the first packet, the controller orders the first requests and the second requests with reference to a ratio of a number of the at least two consecutive second requests to a number of the at least one first request or with reference to the number of the at least two consecutive second requests.

3. The storage device of claim 1, wherein:
   the at least one first command corresponds to at least one read command for the storage device, and
   the at least one second command corresponds to at least one write command for the storage device.

4. The storage device of claim 3, wherein the controller receives the responses that the host generates in response to the at least two consecutive second requests.

5. The storage device of claim 4, wherein the controller orders the first requests and the second requests with reference to a reception frequency of the responses.

6. The storage device of claim 1, wherein the controller includes a request scheduler configured to order the first requests and the second requests with reference to a ratio of a number of the at least two consecutive second requests to a number of the at least one first request, the number of the at least two consecutive second requests, or a reception frequency of responses received from the host in response to the second requests.

7. The storage device of claim 6, wherein the controller includes:
   an application layer configured to generate the first requests and the second requests;
   a link layer configured to generate the first packet; and
   a physical layer configured to transmit the first packet to the host and receive the second packet from the host.

8. The storage device of claim 7, wherein the request scheduler receives the first requests and the second requests output from the application layer.

9. The storage device of claim 1, wherein:
   the nonvolatile memory device includes a memory cell array that includes a plurality of memory cells formed to be perpendicular to a substrate and connected to a plurality of word lines and a plurality of bit lines, and
   a plurality of cell strings, each of which includes serially connected memory cells among the plurality of memory cells, that are connected in common to a bit line.

10. The storage device of claim 1, wherein the controller includes a request scheduler configured to order the first and the second requests such that the at least one first request and the at least two consecutive second requests are aligned.

11. A controller of a storage device that is configured to perform two-way communication with a host, the controller comprising:
an interface circuit configured to:
receive at least one first command and at least one second command from the host,
in response to the at least one first command, generate first requests which include read data received from a nonvolatile memory device,
in response to the at least one second command, generate second requests; and
a request scheduler configured to order the first and second requests such that at least one first request from among the first requests and at least two consecutive second requests are aligned, wherein:
the interface circuit is further configured to generate a first packet based on the ordered requests, transmit the first packet to the host, and receive a second packet from the host, and
the second packet includes responses to the at least two consecutive second requests and write data to be stored in the nonvolatile memory device.

12. The controller of claim 11, wherein the request scheduler orders the first requests and the second requests with reference to a ratio of a number of the at least two consecutive second requests to a number of the at least one first request or with reference to the number of the at least two consecutive second requests.

13. The controller of claim 12, wherein:
the first requests are write requests for a host memory of the host, wherein the at least one first command corresponds to at least one read command for the storage device, and
the second requests are read requests for the host memory, wherein the at least one second command corresponds to at least one write command for the storage device.

14. The controller of claim 13, wherein the interface circuit receives responses that the host generates in response to the at least two consecutive second requests.

15. The controller of claim 14, wherein the request scheduler orders the first requests and the second requests with reference to a reception frequency of the responses.

16. The controller of claim 11, wherein the request scheduler orders the first requests and the second requests with reference to a ratio of a number of the at least two consecutive second requests to a number of the at least one first request, the number of the at least two consecutive second requests, or a reception frequency of responses received from the host in response to the second requests.

17. The controller of claim 11, wherein the interface circuit further includes:
a link layer configured to generate the first packet; and
a physical layer configured to transmit the first packet to the host and receive the second packet from the host.

18. A method of operating a storage device, comprising a controller and a nonvolatile memory device, that is configured to perform two-way communication with a host, the method comprising:
receiving at least one first command and at least one second command from the host;
in response to the at least one first command, generating first requests which include read data received from the nonvolatile memory device;
in response to the at least one second command, generating second requests;
generating a first packet which
includes at least one first request from among the first requests and at least two consecutive second requests from among the second requests;
transmitting the first packet to the host; and
receiving a second packet from the host, the second packet including responses to the at least two consecutive second requests and write data to be stored in the nonvolatile memory device.

19. The method of claim 18, further comprising receiving the responses that the host generates in response to the second requests.

20. The method of claim 19, further comprising ordering the plurality of requests with reference to the reception frequency of the responses.

* * * * *